United States Patent
Sako et al.

(10) Patent No.: US 7,483,957 B2
(45) Date of Patent: Jan. 27, 2009

(54) SERVER, DISTRIBUTION SYSTEM, DISTRIBUTION METHOD AND TERMINAL

(75) Inventors: Yoichiro Sako, Tokyo (JP); Tomihiro Nakagawa, Kanagawa (JP); Shunsuke Furukawa, Tokyo (JP); Mitsuru Toriyama, Chiba (JP); Tatsuya Inokuchi, Kanagawa (JP); Kaoru Kijima, Tokyo (JP); Kazuko Sakurai, Tokyo (JP); Junichi Kudo, Tokyo (JP); Yoshimasa Utsumi, Tokyo (JP); Akira Tange, Tokyo (JP)

(73) Assignee: Sony Corporation, Tokyo (JP)

( * ) Notice: Subject to any disclaimer, the term of this patent is extended or adjusted under 35 U.S.C. 154(b) by 776 days.

(21) Appl. No.: 09/950,651

(22) Filed: Sep. 12, 2001

(65) Prior Publication Data

US 2002/0032728 A1  Mar. 14, 2002

(30) Foreign Application Priority Data

Sep. 12, 2000 (JP) ............ P2000-281751

(51) Int. Cl.
*G06F 15/16* (2006.01)
*G06Q 30/00* (2006.01)
*A63F 9/24* (2006.01)
*A63F 13/00* (2006.01)
*G06F 17/00* (2006.01)
*G06F 19/00* (2006.01)

(52) U.S. Cl. ............ 709/217; 709/203; 709/219; 705/26

(58) Field of Classification Search ........... 709/203, 709/217, 219, 215, 223; 707/10
See application file for complete search history.

(56) References Cited

U.S. PATENT DOCUMENTS

| | | | | |
|---|---|---|---|---|
| 5,617,142 | A | * | 4/1997 | Hamilton ............ 375/240.03 |
| 5,884,033 | A | | 3/1999 | Duvall et al. |
| 5,978,766 | A | * | 11/1999 | Luciw ..................... 705/1 |
| 6,009,410 | A | * | 12/1999 | LeMole et al. ........ 709/219 |
| 6,036,601 | A | * | 3/2000 | Heckel .................. 463/42 |
| 6,186,893 | B1 | * | 2/2001 | Walker et al. ......... 463/20 |

(Continued)

FOREIGN PATENT DOCUMENTS

JP  2001273557 A  * 10/2001

OTHER PUBLICATIONS

Patent Abstract of Japan, 11261536, publication date, Sep. 24, 1999.

*Primary Examiner*—John Follansbee
*Assistant Examiner*—Hassan Phillips
(74) *Attorney, Agent, or Firm*—Finnegan, Henderson, Farabow, Garrett & Dunner, L.L.P.

(57) ABSTRACT

The present invention provides a content-on-demand system capable of managing users' system-utilization frequencies such as download counts and connection times as well as changing the quality of a content transmitted from a server to a user in dependence on the system-utilization frequency of the user. Thus, a high-quality content or a highly functional content is provided to a user with a high system-utilization frequency. By differentiating contents provided to users in accordance with the system-utilization frequencies of the users, network businesses can be activated.

24 Claims, 12 Drawing Sheets

U.S. PATENT DOCUMENTS

| | | | |
|---|---|---|---|
| 6,267,672 B1 * | 7/2001 | Vance | 463/29 |
| 6,351,745 B1 * | 2/2002 | Itakura et al. | 707/10 |
| 6,443,843 B1 * | 9/2002 | Walker et al. | 463/42 |
| 6,450,407 B1 * | 9/2002 | Freeman et al. | 705/14 |
| 6,473,792 B1 * | 10/2002 | Yavitz et al. | 709/217 |
| 6,594,692 B1 * | 7/2003 | Reisman | 709/219 |
| 6,616,533 B1 * | 9/2003 | Rashkovskiy | 463/31 |
| 6,928,414 B1 * | 8/2005 | Kim | 705/14 |
| 6,947,988 B1 * | 9/2005 | Saleh | 709/226 |
| 7,039,699 B1 * | 5/2006 | Narin et al. | 709/224 |
| 7,085,377 B1 * | 8/2006 | Norr | 380/37 |
| 7,113,918 B1 * | 9/2006 | Ahmad et al. | 705/26 |
| 2003/0027631 A1 * | 2/2003 | Hedrick et al. | 463/29 |
| 2003/0032476 A1 * | 2/2003 | Walker et al. | 463/25 |

\* cited by examiner

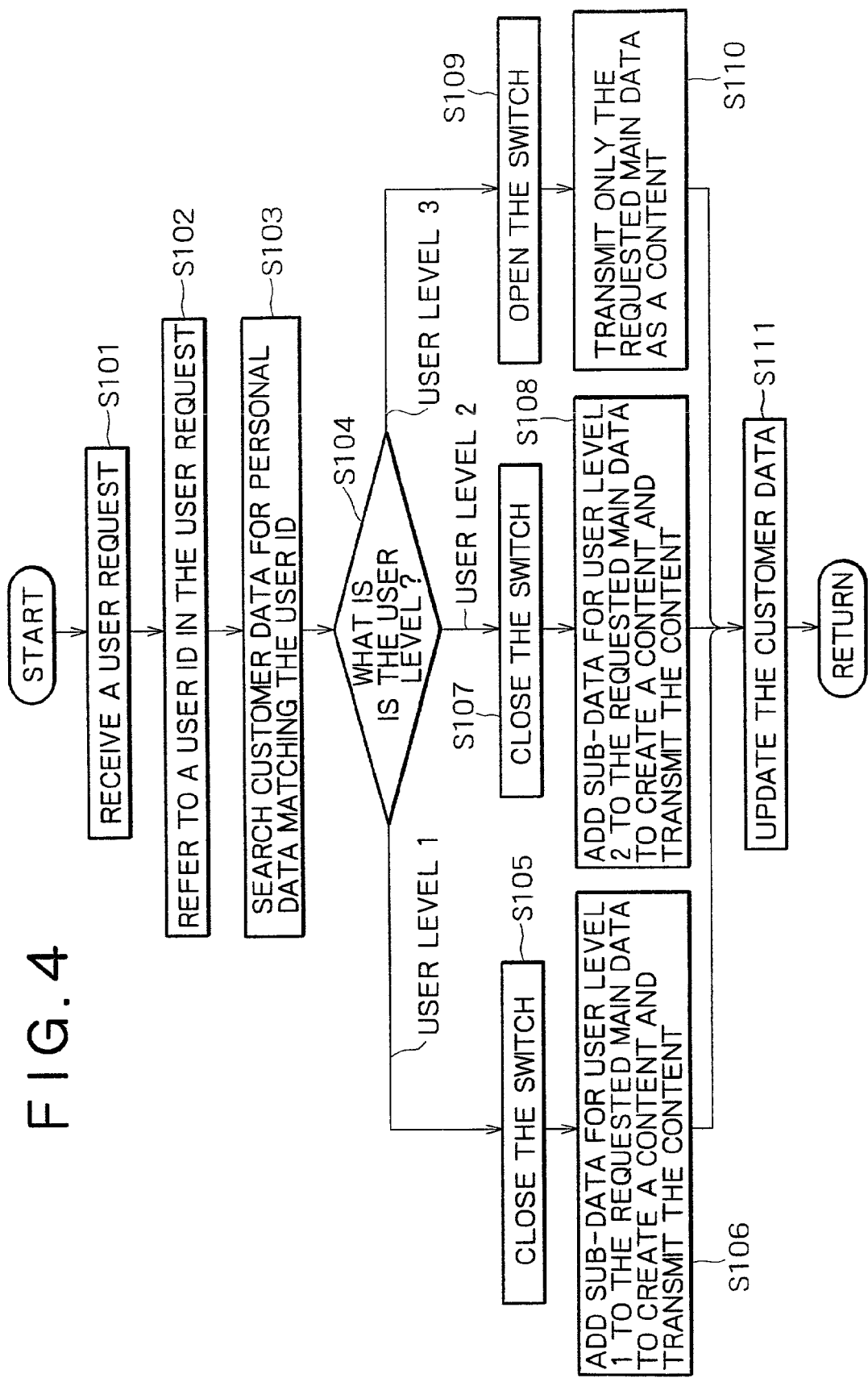
F I G. 4

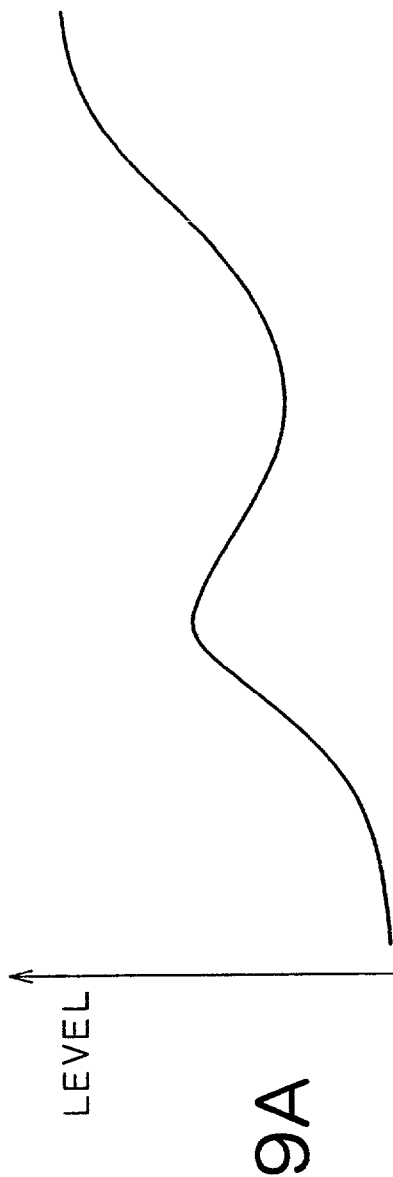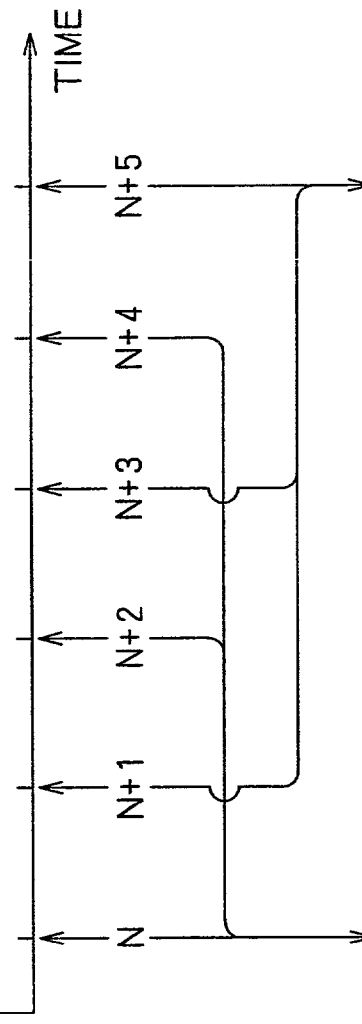
FIG. 9A
FIG. 9B
FIG. 9C

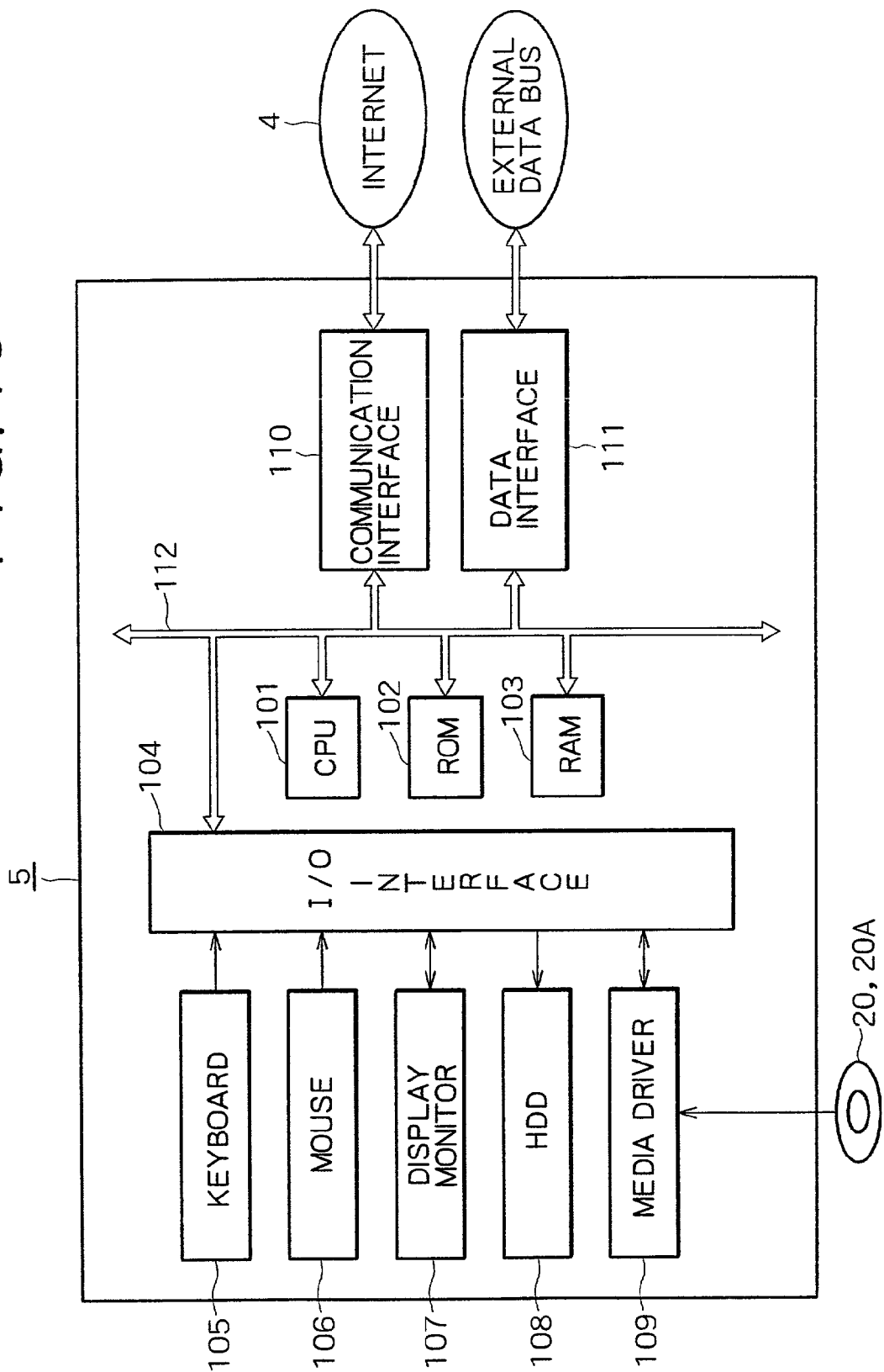

SERVER, DISTRIBUTION SYSTEM, DISTRIBUTION METHOD AND TERMINAL

BACKGROUND OF THE INVENTION

The present invention relates to a distribution system, a distribution method, a terminal and a server connected to a communication line such as a network.

The so-called content such as a piece of music, video software or game software is stored in a server as digital data. A content can be downloaded from a server to an apparatus connected to the server by a public communication line such as an ISDN (Integrated Standard Digital Network), an analog telephone line or a satellite communication line. Such a system implementation is known as a COD (Content On Demand) system.

FIG. 1 is a diagram showing a typical implementation of the COD system in a simple and plain manner.

A server 1 receives contents such as a piece of music, video software like a movie and game software, which are produced by a content holder company 2. The server 1 converts such a content into digital data and stores the digital data as content data.

The server 1 is connected to for example user terminals 5 owned by worldwide users A, B, . . . and Z by the Internet 4 and therefore capable of communicating with the terminals 5.

The server 1 transmits a menu showing a list of contents to a specific user terminal 5 connected to the server 1. The specific user terminal 5 displays the menu received from the server 1 typically as the so-called browser screen, and allows the user of the user terminal 5 to select a desired content from the menu and download the selected content from the server 1 to the user terminal 5 in accordance with a necessary operation procedure. Then, the user of the user terminal 5 transmits a content order for downloading the selected content.

In operations carried out by the user to transmit the content order, the user enters the number of the user's credit card or bank account and an authentication code, which is accounting information used by the server to authenticate the user. As an alternative, the user may enter the identification code of a prepaid card purchased by the user as accounting information. These pieces of data are included in the content order.

The server 1 receives the content order through the Internet 4 and uses data such as an authentication code included in the content order to authenticate the user.

In the server 1, there are stored a number of contents supplied by the content holder company 2 as data. If the user is authenticated as an authorized user, the server 1 transmits a content specified in the content order to the user terminal 5. At that time, a payment is made by a bank 3 with which the user made a contract. The payment is based on the counting information included in the content order.

The data of the content transmitted by the server 1 as described above is received by the user terminal 5 and stored in a recording medium provided for contents. That is to say, the content is downloaded from the server 1 to the user terminal 5.

In this way, it is possible to construct a COD system wherein the user is capable of purchasing a desired content and downloading the content through a communication line.

By the way, in an ordinary market where commodities are available in stores or the like for sales, a service offering a discount price or an added value such as an extra gift is often rendered to a customer who purchases commodities frequently or purchases commodities at a total price exceeding a predetermined value. In this way, purchasing desires of the customers are aroused and competition among stores is promoted, making the market brisker.

In business transactions through a network which are conducted in the COD system described above, however, such a service does not exist.

SUMMARY OF THE INVENTION

In view of the foregoing, the present invention has been made, and an object of the present invention is to provide a server, a distribution system, a distribution method, and a terminal capable of making typically a market brisk by rendering services which are different in dependence on the degree of utilization in, for example, a COD system.

According to a first aspect of the present invention, there is provided a server including: main-data-storing means for storing main data; sub-data-storing means for storing sub-data relevant to the main data stored in the main-data-storing means; user-information-storing means for storing information intrinsic to users; receiving means for receiving information identifying a user; comparison means for comparing user-identifying information received by the receiving means with user-intrinsic information stored in the user-information-storing means; determination means for determining utilization status of a user in dependence on a comparison result produced by the comparison means; and control means for executing control to transmit either only main data stored in the main-data-storing means or main data stored in the main-data-storing means as well as sub-data stored in the sub-data-storing means in dependence on a determination result produced by the determination means.

According to a second aspect of the present invention, there is provided a distribution system comprising an information center and a plurality of terminals each connected to the information center by a predetermined communication line, the information center including: main-data-storing means for storing main data; sub-data-storing means for storing sub-data relevant to the main data stored in the main-data-storing means; user-information-storing means for storing information intrinsic to users; receiving means for receiving information identifying a user; comparison means for comparing user-identifying information received by the receiving means with user-intrinsic information stored in the user-information-storing means; determination means for determining utilization status of a user in dependence on a comparison result produced by the comparison means; and control means for executing control to transmit either only main data stored in the main-data-storing means or main data stored in the main-data-storing means as well as sub-data stored in the sub-data-storing means in dependence on a determination result produced by the determination means.

According to a third aspect of the present invention, there is provided a distribution method for distributing contents from an information center to a plurality of terminals each connected to the information center by a predetermined communication line, the distribution method comprising the steps of: receiving a user identification and a content order from any of the terminals; referencing customer data stored in a memory employed in the information center in accordance with a user identification received by the receiving step; determining utilization status based on customer data referenced by the data-referencing step; and forming a judgment as to whether or not to add additional data to a content to be transmitted to one of the terminals in response to a content order received from the terminal in accordance with utilization status determined by the utilization-status-determining step.

According to a fourth aspect of the present invention, there is provided a terminal capable of communicating with an information center through a communication line connecting the terminal to the information center and capable of recording and playing back data onto and from a recording medium which has a plurality of data recording areas, the terminal including: transmission means for transmitting a user identification and a content order specifying a content to the information center; reception means for receiving a content selected by the information center in accordance with the user identification and the content order and additional data determined by the information center to be added to the content from the information center; and recording means for recording a content and additional data, which are received by the reception means, in the respective different data recording areas of the recording medium.

Thus, with the configuration described above, each of the terminals is capable of receiving and acquiring a content and additional data added to the content by transmission of a user identification and a content order specifying the content to the information center.

In an operation to record a content and additional data, which are received as described above, into the recording medium having a plurality of data recording areas, the content and the additional data are stored in the respective different data recording areas of the recording medium. In this way, the content and the additional data can be properly downloaded in accordance with a predetermined format of the recording medium.

BRIEF DESCRIPTION OF THE DRAWINGS

FIG. 4 is a flowchart representing the procedure of processing carried out by the first implementation of the server 1 in accordance with the present invention;

FIG. 9A is a diagram showing the waveform of an analog-data signal sampled at a sampling frequency of 88.2 kHz;

FIG. 9B is a diagram showing an array of data samples located at even-numbered positions;

FIG. 9C is a diagram showing an array of data samples located at odd-numbered positions;

FIG. 10 is a detailed block diagram showing the configuration of a user terminal 5;

DETAILED DESCRIPTION OF THE PREFERRED EMBODIMENTS

Hereinafter, preferred embodiments of the present invention will be described. In a COD system implemented by an embodiment of the present invention, a variety of contents represented mainly by musical audio data are distributed by an information center to terminals each connected to the information center by a communication line.

In the present invention, contents distributed in the COD system are not limited to musical audio data. For example, a content may also be video software or game software. In order to make the description easy to understand, however, the COD system in the following description is basically a COD system distributing pieces of music.

The preferred embodiments are described in the following order.
1: COD System (First Embodiment)
   1-1: Distribution of Contents
   1-2: Server Configuration (First implementation)
   1-3: Server Operation (First implementation)
   1-4: Server Configuration (Second implementation)
   1-5: Server Operation (Second implementation)
2: COD System (Second Embodiment)
   2-1: Format of High-Quality Audio Data
   2-2: System Configuration
3: User-Terminal Configuration
4: Operations to Record and Play Back Contents

1: COD System (First Embodiment)

1-1: Distribution of Contents

Figure 2:
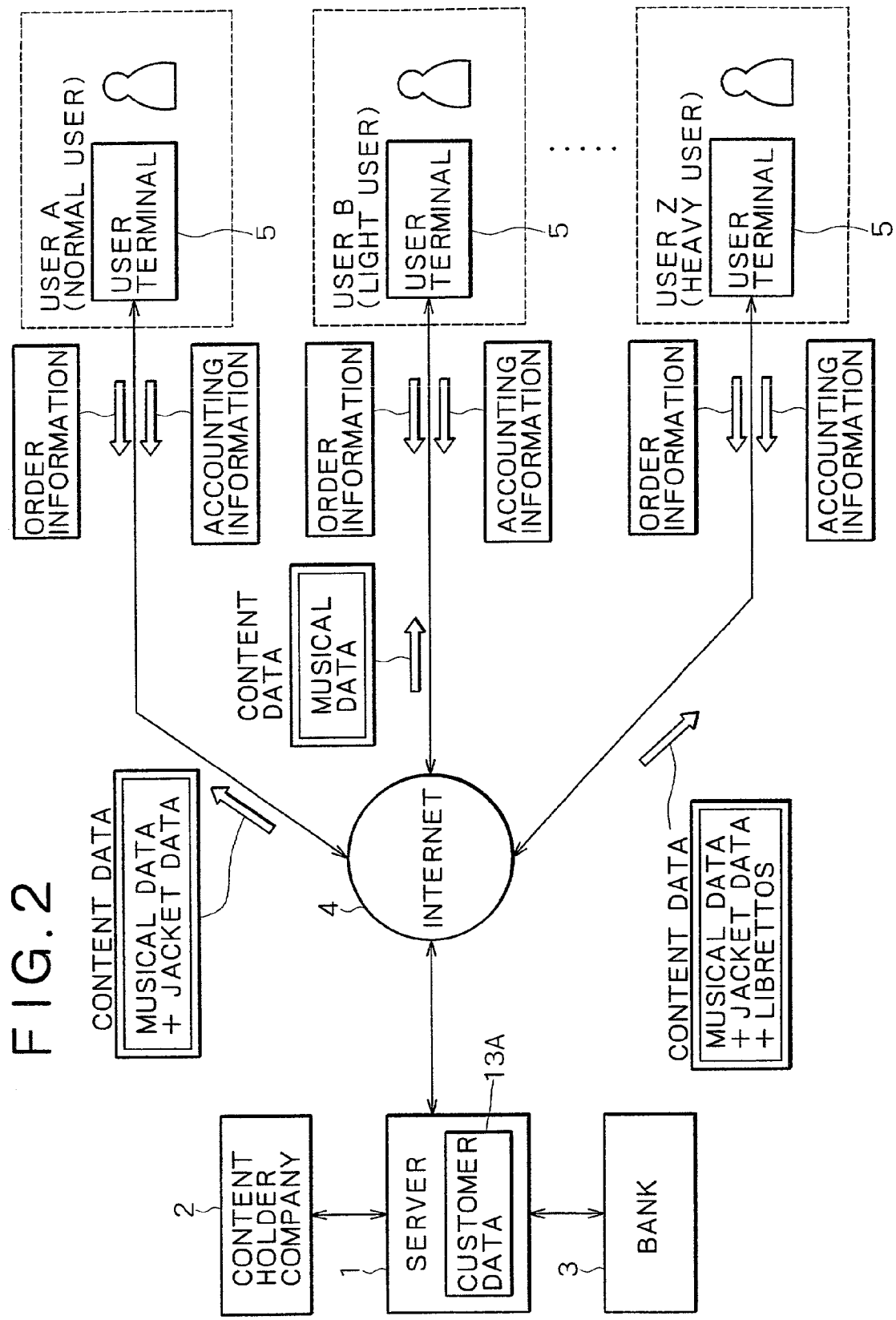
FIG. 2 is a diagram showing the overall configuration of a content-distributing system implemented by a first embodiment of the present invention.

FIG. 2 is a block diagram showing a typical construction of a COD system implemented by a first embodiment of the present invention and distribution of contents in the COD system.

A server 1 receives contents such as a piece of music, video software like a movie and game software, which are produced by a content holder company 2. The server 1 converts such a content into digital data and stores the digital data content data.

The server 1 is connected to for example user terminals 5 owned by worldwide users A, B, . . . and Z by the Internet 4 and therefore capable of communicating with the terminals 5.

It should be noted that a user terminal 5 can be a personal computer having a function for connecting the personal computer to the Internet 4. As an alternative, a user terminal 5 can be an apparatus having a function to record and play back data onto and from a disc-shaped recording medium compatible with the present invention and a function for connecting the apparatus to the Internet 4.

In addition, at least, a communication line connecting any of the user terminals 5 to the server 1 is not limited to the Internet 4. The communication line can be another public communication line such as an ISDN, an analog telephone line or a satellite communication line.

In order to establish a connection between a user terminal 5 owned by a user and the server 1, the user needs to carry out a predetermined operation by using an input device such as a mouse or a keyboard to enter a URL (Uniform Resource Locator) assigned to the server 1 and make an access to the server 1.

In response to the access, the server 1 transmits typically a content guide showing for example a list of contents to the user terminal 5 connected to the server 1.

In the case of musical contents, the content guide includes the titles of pieces of music, the names of artists, genres and prices. In the case of video-software contents, the content guide includes titles, the names of producers, genres and prices. In the case of game-software contents, the content guide includes the names of game software, the titles of producers and prices.

The user terminal 5 displays the content guide received from the server 1 typically as the so-called browser screen. This browser screen is a GUI (Graphic User Interface) which allows the user to carryout an operation to enter various kinds of necessary input data such as data specifying or selecting a desired content.

That is to say, a user owning the user terminal 5 is capable of selecting a desired content by executing a predetermined operation procedure. After selecting a desired content, the user is capable of carrying out an operation to transmit a content order making a request to download the selected content.

It should be noted that a content order naturally includes a content identification for specifying a desired content. In an operation to transmit a content order, the user needs to enter the number of the user's credit card or bank account and an authentication code serving as accounting information for authenticating the user. In place of an authentication code, the user is allowed to enter the identification code of a prepaid card, which has been purchased by the user, as accounting information. These pieces of information entered by the user are included in the content order.

The server 1 receives the content order transmitted by the user terminal 5 by way of the Internet 4. The server 1 then authenticates the user by using, among others, the authentication code included in the content order. If the user placing the content order is authenticated successfully, the user is considered to be a user entitled to a COD service.

The server 1 has stored a large number of contents supplied by the content holder company 2 as data. After verifying that the user is a successfully authenticated user, the server 1 searches the content repertory for one specified by the content identification included in the content order.

Then, the server 1 transmits the content found in the search to the user terminal 5. The user terminal 5 stores the content received from the server 1 in a recording medium for keeping the content. In this way, a content is downloaded from the server 1 to the user terminal 5.

In this transaction to download the content, a bank 3 with which the user made a contract pays a price for the content purchased by the user. The payment is based on the accounting information included in the content order. As described above, the accounting information can be the number of a credit card, a bank account, a prepaid card or the like. The amount of money paid by the bank 3 includes a profit and an operating cost incurred by a company managing the server as well as a profit and a manufacturing cost incurred by the content holder company 2 producing the content.

So far, basic distribution of contents to users in a COD system implemented by the first embodiment shown in FIG. 2 has been described.

Figure 1:
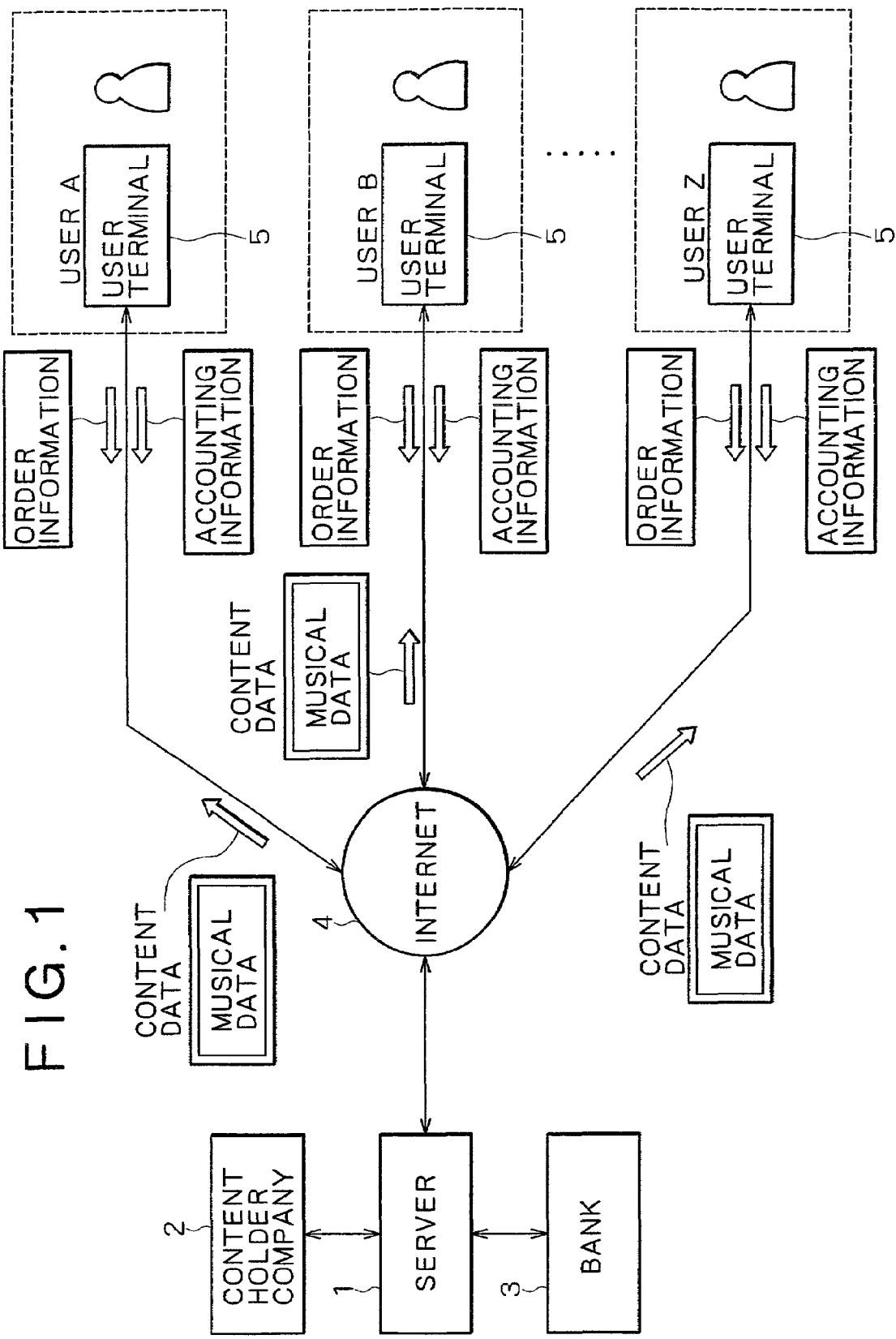
FIG. 1 is a diagram showing the overall configuration of the conventional content-distributing system.

If the server 1 unconditionally downloads only a content specified in a content order in the COD system shown in FIG. 2, this embodiment is not specially different from that shown in FIG. 1. In addition to the authentication of a user, the server 1 employed in this embodiment may transmit not only a specified content, but also additional information relevant to the content in accordance with status of service utilization by the user as will be described later. To put it in detail, a service is rendered to the user as a bonus in accordance with status of service utilization, and the substance of the service is changed also in accordance with status of service utilization.

The server 1 has customer data 13A including predetermined information that can be used for determining status of service utilization by each user requesting the server 1 to download a content.

The customer data 13A is used for determining each user's level indicating the status of service utilization by the user. The user level determined in this way is in turn used for determining typically sub-data relevant to musical data specified originally as main data. The server 1 then transmits the main data and the sub-data as a content to the user terminal 5.

In this embodiment, the server 1 classifies user service utilization status included in the user data 13A into three user levels. To be more specific, the highest user level is a level of heavy-spending users. A level second to the highest user level is a level of normal-spending users. The lowest user level is a level of light-spending users. In the embodiment shown in FIG. 2, user A is a normal-spending user, user B is a light-spending user and user Z is a heavy-spending user.

If the server 1 receives a content order from the user terminal 5, that is, if the user terminal 5 places a content order for a piece of music, the level of a user placing the content order is determined on the basis of the customer data 13A and a user ID included in the content order. Then, data of a content to be downloaded is typically changed as follows.

Assume that the user who transmitted the content order from the user terminal 5 is determined to be user B who is a light-spending user. In this case, as shown in the figure, only musical data is transmitted to the user terminal 5 as a content. That is to say, only the ordered data is transmitted with no sub-data added thereto.

If the user who transmitted the content order from the user terminal 5 is determined to be user A who is a normal-spending user, a content including the so-called jacket data is transmitted to the user terminal 5. The jacket data is a picture appearing on a jacket for the ordered musical data. By playing back the content, for example, the picture of the jacket can be displayed.

If the user who transmitted the content order from the user terminal 5 is determined to be user Z who is a heavy-spending user, a content including jacket data and libretto data is transmitted to the user terminal 5. The libretto data is a kind of picture data displaying a text and/or a libretto as characters. By playing back the libretto data, the libretto can be displayed. It should be noted that karaoke data may also be included in a content to be transmitted to a heavy-spending user in place of the jacket data and libretto data.

As described above, in the server 1 implemented by this embodiment, the level of a user is determined in accordance with status of service utilization by the user. The level of a user is in turn used for determining data of a jacket and/or a libretto to be added to a piece of music serving as main data. By adding data of a jacket and/or a libretto to a piece of music serving as main data, a value of musical software like that of a CD is added to the main data.

With such a configuration, it is possible to raise the level of a service rendered to a user in accordance with status of service utilization by the user in the same way as, for example, the ordinary market in the so-called network shopping through a network such as the Internet 4. Thus, shopping desires of users are increased and market competition among business entrepreneurs is also excited. As a result, the network shopping becomes brisker.

1-2: Server Configuration (First Implementation)

Figure 3:
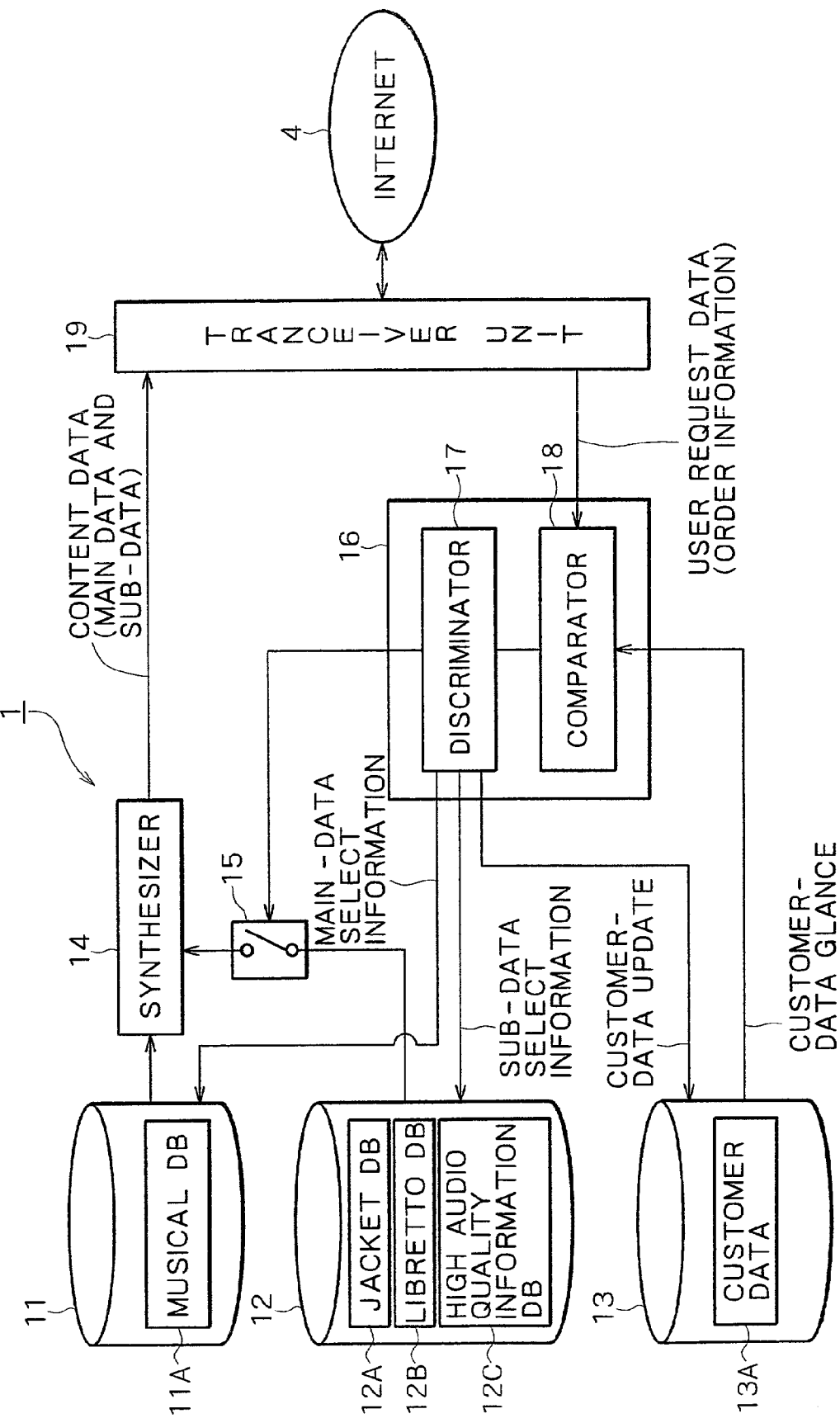
FIG. 3 is a block diagram showing a first implementation of a server 1 employed in the content-distributing system shown in FIG. 2.

FIG. 3 is a block diagram showing a typical internal configuration of the server 1 employed in the COD system shown in FIG. 2. It should be noted that first and second typical operations of the first embodiment will be described later, and the internal configuration shown in FIG. 3 is a configuration for the first typical operation.

As shown in FIG. 3, the server 1 actually comprises three servers, namely, a main-data server 11, a sub-data server 12 and a customer-data server 13.

The main-data server 11 is used for storing and handling main data to be distributed as contents. The main-data server 11 includes a musical database 11A for storing a large number of pieces of music in a database format.

The sub-data server 12 is used for storing and handling sub-data to be included in a distributed content. As described earlier by referring to FIG. 2, sub-data to be added to musical data to be distributed as a content can be a jacket, a libretto and the like. For this reason, the sub-data server 12 is provided with a jacket database 12A and a libretto database 12B.

It should be noted that a high audio quality information database 12C included in the sub-data server 12 as shown in the figure is another database used in a second embodiment to be described later. Thus, the high audio quality information database 12C is not described here.

A large number of users makes use of the COD system implemented by this embodiment. For this reason, the customer-data server 13 stores and handles customer data 13A which is used for management of status of service utilization by users making use of the COD system of this embodiment so far.

Figure 5:
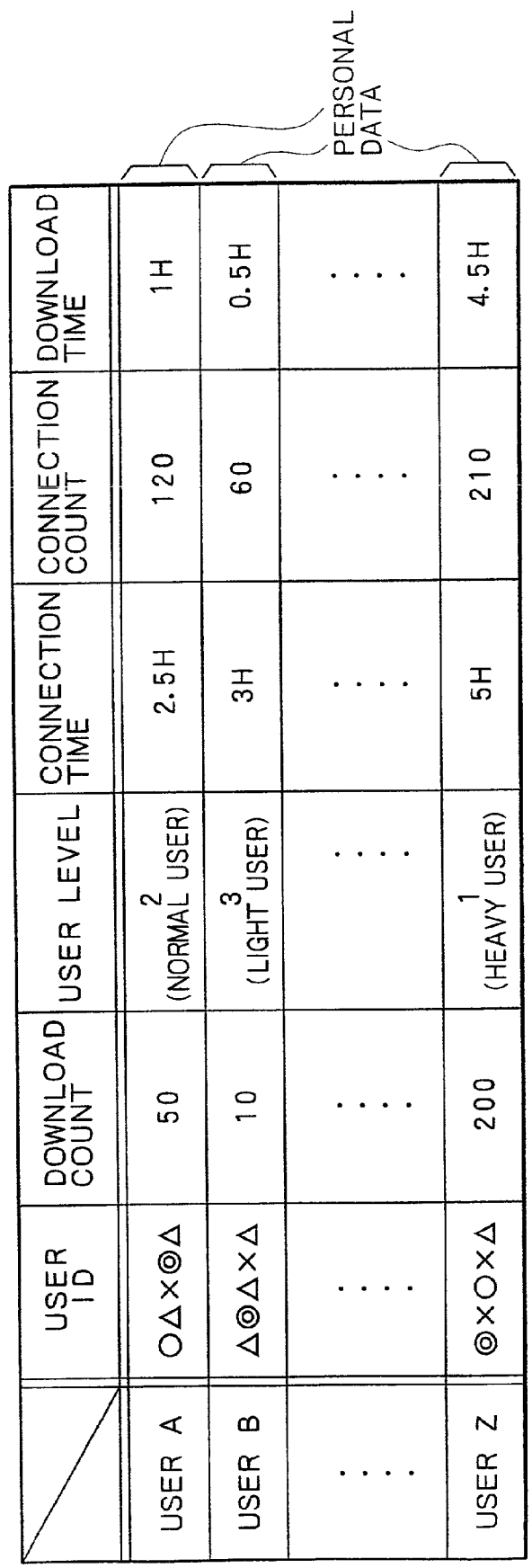
FIG. 5 is a customer-data table managed by a customer-data server 13 employed in the server 1 employed in the content-distributing system shown in FIG. 2.

FIG. 5 is a diagram conceptually showing the structure of the customer data 13A.

As shown in the figure, the customer data 13A is a set of personal status of service utilization for each of users A, B, - - - and Z making use of the COD system by accessing the server 1. The personal status of each user typically comprises a user ID, a download count, a user level, a connection time, a connection count and a download time as shown in the figure.

The user ID of a user is an ID which is uniquely assigned to the user when the user made an initial contract for utilizing the COD system implemented by this embodiment.

The download count of a user is the cumulative number of times download operations have been carried out so far by the user.

The user level of a user represents status of service utilization by the user. This status is given to the user in accordance with a predetermined rule based on the degree of previous COD-system utilization by the user and a utilization history of the user. The user level can be set by using at least typically the download count or one of the connection time, the connection count and the download time, which are described below.

In order to make the description easy to understand, there are provided three user levels, namely, user levels 1, 2 and 3. It should be noted, however, that the number of levels is not restricted to 3. User level 1 represents the highest status of service utilization for heavy-spending users described earlier by referring to FIG. 2. User level 2 represents the next status of service utilization for normal-spending users. User level 3 represents the lowest status of service utilization for light-spending users.

The connection time is a utilization history representing a cumulative period of time during which the user terminal 5 owned by the user is connected to the server 1. The connection count of a user is the number of times connections between the user terminal 5 owned by the user and the server 1 have been established so far.

The download time is a cumulative period of time which has been required so far by the user to download contents from the server 1.

As described earlier, a user level of a user is set on the basis of status of service utilization by the user, that is, information such as the download count, the connection time, the connection count and the download time.

In the typical customer data 13A shown in FIG. 5, the user level is set on the basis of the download count only. To put it in detail, download counts are classified into three categories separated from each other by limits. The three download-count categories are associated with the three user levels respectively. In the typical customer data 13A shown in FIG. 5, user level 1 is assigned to user Z with a download count of 200 and user level 2 is assigned to user A with a download count of 50. User level 3 is assigned to user B with a download count of 10.

In actuality, in place of the download count, at least one of the connection count, the connection time and the download time can also be used for setting the user level.

For example, assume that the user level is set by using only the connection time. In this case, typically, user level 1 is assigned to user Z with a connection time of 5 hours and user level 2 is assigned to user B with a connection time of 3 hours. User level 3 is assigned to user A with a connection time of 2.5 hours.

In this embodiment, if the download count is used as a criterion for setting the user level, user B with a download count of 10 has user level lower than user A with a download count of 50. If the connection time is used as a different criterion for setting the user level, on the other hand, user B with a connection time of 3 hours has user level higher than user A with a connection time of 2.5 hours. From the standpoint of a content sales enterprise, a user with a higher download count, namely, user A in this case, is a heavier-spending user. From the standpoint of a communication company, on the other hand, a user with a longer connection time, namely, user B in this case, is a heavier-spending user. It is not unusual that a communication company also manages a content sales enterprise. In this case, the connection time may take precedence of the download count.

It is needless to say that the user level can also be set by using a combination of two or more criteria properly selected among the download count, the connection count, the connection time and the download time.

That is to say, the download count, the connection count, the connection time and the download time each representing status of system utilization have implications different from each other. Thus, by taking the implications into consideration, one or more pieces of information suitable for COD management are selected among the download count, the connection count, the connection time and the download time to be used as criteria.

For example, a user with a small download count but with a server-connection time exceeding a predetermined value can be considered to be a user spending time mostly on looking at and reading displayed advertisements during the server-connection time. In return for the connection time, the user level set for such a user may conceivably be raised in accordance with increases in connection time.

In addition, a time it takes to download a server with the same size may vary from time to time in dependence on the congestion state of the communication line. In this case, the user can be assumed to look at and read displayed advertisements during the download time. Thus, the user level may conceivably be set by taking the download time into consideration.

Refer back to FIG. 3.

A control unit 16 controls the operation of the server 1. In this embodiment, the control unit 16 comprises a discriminator 17 and a comparator 18, which are each a functional block implemented by typically a software program. The operations of the discriminator 17 and the comparator 18 are described later.

A mixer 14 carries out processing to mix musical data used as main data output by the main-data server 11 with sub-data supplied by the sub-data server 12 by way of a switch 15, producing a combined content. The mixer 14 supplies the content to a transceiver unit 19. The transceiver unit 19 transmits the content by multiplexing the main data and the sub-data, which are mixed in the content, typically on a time-division basis.

The switch 15 is provided for blocking or passing on sub-data supplied by the sub-data server 12 to the mixer 14. For this reason, in this embodiment, the switch 15 is provided between the sub-data server 12 and the mixer 14 as shown in the figure. The switch is opened or closed by control executed by the control unit 16.

The transceiver unit 19 is provided for carrying out communications between the server 1 and external apparatuses through the Internet 4. Information supplied to the server 1 by way of the Internet 4 is received by the transceiver unit 19. On the other hand, information such as mainly a content is transmitted to another apparatus by way of the Internet 4.

It should be noted that, in actuality, the server 1 typically has a configuration capable of transmitting a content guide described earlier. However, members for executing such a function are not shown in the figure. That is to say, only members for executing the function to transmit a content are shown in the figure.

1-3: Server Operation (First Implementation)

With reference to a flowchart shown in FIG. 4, the following describes the operation of the server 1 having the configuration described above to distribute a content explained earlier by referring to FIG. 2. It should be noted that, in order to make the description easy to understand, the flowchart shown in FIG. 4 represents only determination of a user level and processing to transmit a content based on the determined user level. For example, other processing such as the authentication of a user is not represented by the flowchart.

First of all, the transceiver unit 19 receives a content order from a user terminal 5 owned by a user through the Internet 4. The content order is then passed on to the control unit 16 as a user request. At a step S101, the control unit 16 receives the user request.

The received user request includes a user ID required for, among other purposes, the user authentication described earlier. At the next step S102, the user ID included in the user request is referenced.

Then, at the next step S103, the customer data 13A stored in the customer-data server 13 is searched for a piece of personal data that matches the user ID referenced at the step S102. To put it concretely, the customer data 13A stored in the customer-data server 13 includes a list of user IDs which are searched for one matching the user ID referenced at the step S102.

In the search, the control unit 16 supplies the list of user IDs to the comparator 18 which compares each of the user IDs on the list with the user ID extracted from the user request at the step S102. If the result of the comparison indicates that the list includes a user ID that matches the user ID extracted from the user request at the step S102, the customer data 13A is then searched for a piece of personal information associated with the user ID extracted from the user request at the step S102.

Subsequently, at the next step S104, a user level is determined. In the determination of a user level, the discriminator 17 acquires the piece of personal data found in the search from the customer-data server 13 and references the value of the user level included in the personal data. If the user level is user level 1, the flow of the operation goes on to a step S105. If the user level is user level 2, the flow of the operation goes on to a step S107. If the user level is user level 3, the flow of the operation goes on to a step S109.

At the step S105 for user level 1, control is executed to close the switch 15 so as set a state in which the mixer 14 mixes musical data serving as main data with sub-data. Then, the flow of the operation goes on to a step S106.

At the step S106, the requested piece of musical data is selected as main data and sub-data for user level 1 is selected to be added to the selected piece of musical data. Then, the selected sub-data is added to the desired piece of musical data selected as main data to create a content. The created content is finally output for transmission.

To put it in detail, the desired piece of musical data is specified by a content identification included in the user request. First of all, the specified piece of musical data is found by searching a musical database 11A of the main-data server 11 and supplied to the mixer 14. The discriminator 17 carries out processing of driving the main-data server 11 to search the database 11A for the specified piece of musical data and to supply the specified piece of musical data found in the search to the mixer 14.

Then, the discriminator 17 outputs information used for selecting sub-data to the sub-data server 12 to select sub-data corresponding to the information which represents a user level determined by the discriminator 17.

The sub-data server 12 then searches a database for sub-data corresponding to sub-data selection information. The sub-data is data to be added to the specified piece of musical data found by the main-data server 11 as described above. As a condition for the search of a database for the sub-data, the sub-data searched for must be associated with the piece of musical data specified by the content identification. In the case of user level 1, the sub-data to be added to the specified piece of musical data is both a jacket data and a libretto as described earlier by referring to FIG. 2. Thus, the jacket database 12A is first searched for jacket data associated with the specified piece of musical data. Then, by the same token, the libretto database 12B is searched for a libretto associated with the specified piece of musical data.

Subsequently, the jacket data and the libretto found in the search operations are supplied to the mixer 14 by way of the switch 15 which has been put in a closed state.

The mixer 14 mixes the musical data serving as main data with the jacket data and the libretto from the main-data server 11 in accordance with a predetermined format to create a content with a transmission format that conforms to the Internet 4. Then, the mixer 14 supplies the created content to the transceiver unit 19 which then transmits the content to the user terminal 5 making the request by way of the Internet 4 to end the processing carried out at the step S106.

At the step S107 for user level 2, control is executed to also close the switch 15.

Then, at the next step S108, the requested piece of musical data is selected as main data and sub-data for user level 2 is selected to be added to the selected piece of musical data. Then, the selected sub-data is added to the desired piece of musical data selected as main data to create a content. The created content is finally output for transmission.

To put it in detail, the desired piece of musical data is specified by a content identification included in the user request. First of all, the specified piece of musical data is found by searching a musical database 11A of the main-data server 11 and supplied to the mixer 14 at the step S108.

In the case of user level 2, the sub-data to be added to the specified piece of musical data is a jacket data only as described earlier by referring to FIG. 2. Thus, the jacket database 12A is then searched for jacket data associated with the specified piece of musical data. Subsequently, the jacket data is supplied to the mixer 14 by way of the switch 15 which has been put in a closed state.

The mixer 14 mixes the musical data serving as main data with the jacket data from the main-data server 11 in accordance with a predetermined format to create a content with a transmission format that conforms to the Internet 4. Then, the mixer 14 supplies the created content to the transceiver unit 19 which then transmits the content to the user terminal 5 making the request by way of the Internet 4.

In the case of user level 3, only musical data serving as main data is transmitted to the user terminal 5 as a content.

At the step S109 for user level 3, control is executed to open the switch 15. Then, at the next step S110, the requested piece of musical data is selected as main data. The selected piece of musical data is finally output for transmission as a content. To put it in detail, the desired piece of musical data is specified by a content identification included in the user request. The specified piece of musical data is found by searching a musical database 11A of the main-data server 11 and supplied to the mixer 14 to be finally transmitted by the transceiver unit 19 to the user terminal 5 through the Internet 4.

After the processing carried out at the step S106, S108 or S110 is completed, the flow of the operation goes to a step S111.

At the step S111, the customer data 13A is updated to reflect results of the current request for the content. That is to say, mainly, the personal data of the user making the request for the content is updated to reflect the current status of service utilization. To be more specific, the personal data of the user making the request for the content is updated by incrementing the download count and the connection count each by one. In addition, the control unit 16 measures a connection time during which the user terminal 5 used for making the current request for the content is connected to the server 1. The control unit 16 also measures a download time required for downloading the content. As the operation to download the content to the user terminal 5 is completed, the measured connection time and the measured download time are added to respectively the connection time and the download time of the personal data. The user level of the personal data is also updated in accordance with the updated download count, the updated connection count, the updated connection time or the updated download time, which is used for setting the user level.

It should be noted that, if the user data 13A includes information such as a total utilization count for all users, that is, information other than personal data, for example, such information must also be updated if necessary.

1-4: Server Configuration (Second Implementation)

By the way, in the first implementation, the value of a content is changed in dependence on the user level of the customer data 13A. The user level is set by using at least one of the download count, the connection count, the connection time and the download time. The user level is thus set in accordance with status of service utilization most suitable for the application. Therefore, the user level in the COD system is a merit in that users can be differentiated from each other.

In actuality, however, conceivably simpler processing can be carried out for differentiating users from each other. That is to say, information most suitable for differentiating users from each other can be selected among typically the download count, the connection count, the connection time and the download time of the customer data 13A as status of service utilization by the user. The selected information is then used for differentiating users from each other.

A second implementation of the first embodiment has a configuration wherein, as described above, users are differentiated from each other on the basis of information selected among pieces of information which are included in the customer data 13A and each represent status of service utilization by the users, and the value of a content is changed in accordance with the selected information.

Figure 6:
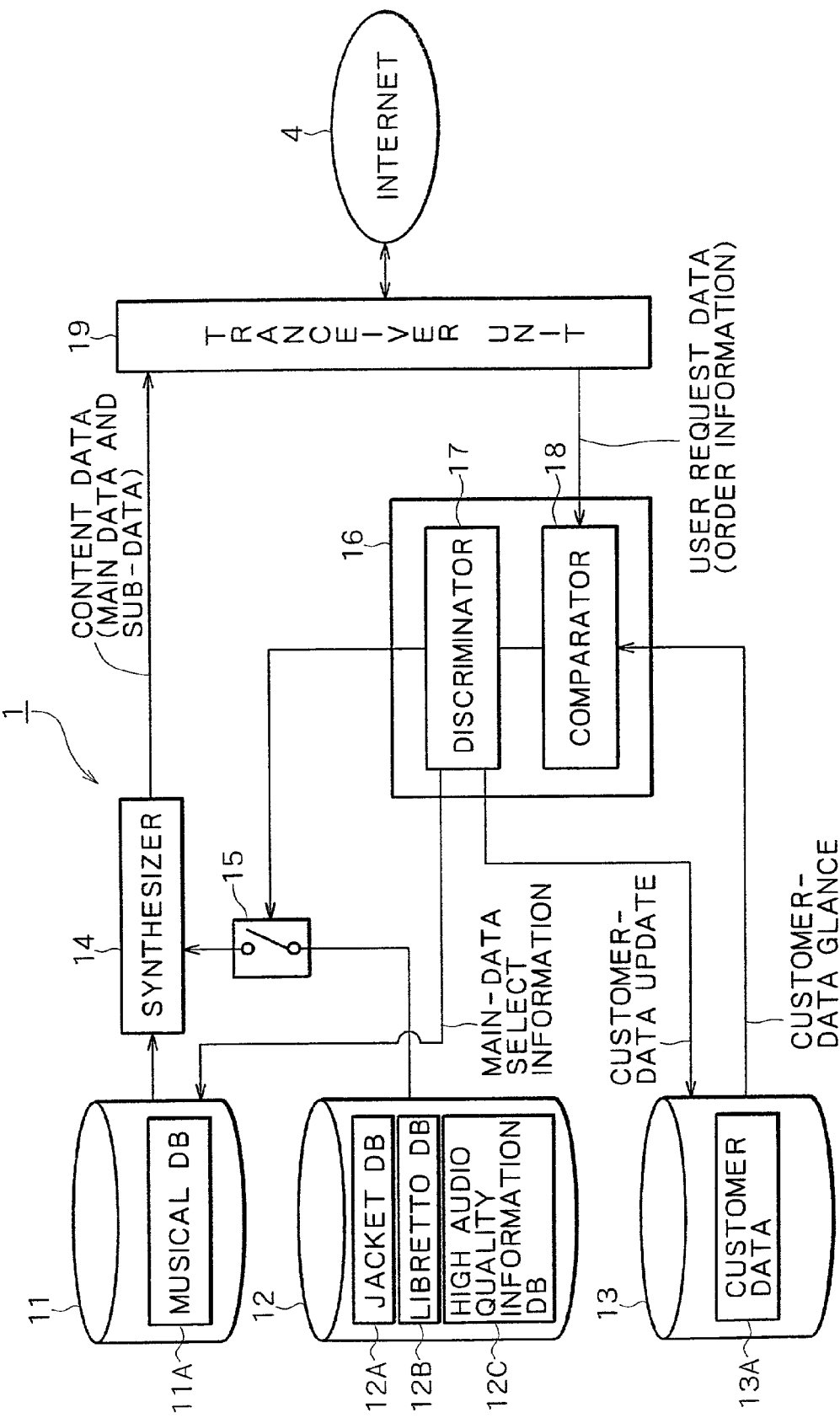
FIG. 6 is a block diagram showing a second implementation of the server 1 employed in the content-distributing system shown in FIG. 2.

FIG. 6 is a block diagram showing the configuration of the server 1 in the second implementation. Components identical with those employed in the server 1 shown in FIG. 3 are denoted by the same reference numerals as the latter, and their description is not repeated.

In the configuration of the server 1 shown in FIG. 3 sub-data is selected in accordance with the user level. For this reason, information for selecting sub-data is supplied from the discriminator 17 employed in the control unit 16 to the sub-data server 12. In the configuration shown in FIG. 6, on the other hand, such sub-data select information is not supplied to the sub-data server 12.

1-5: Server Operation (Second Implementation)

Figure 7:
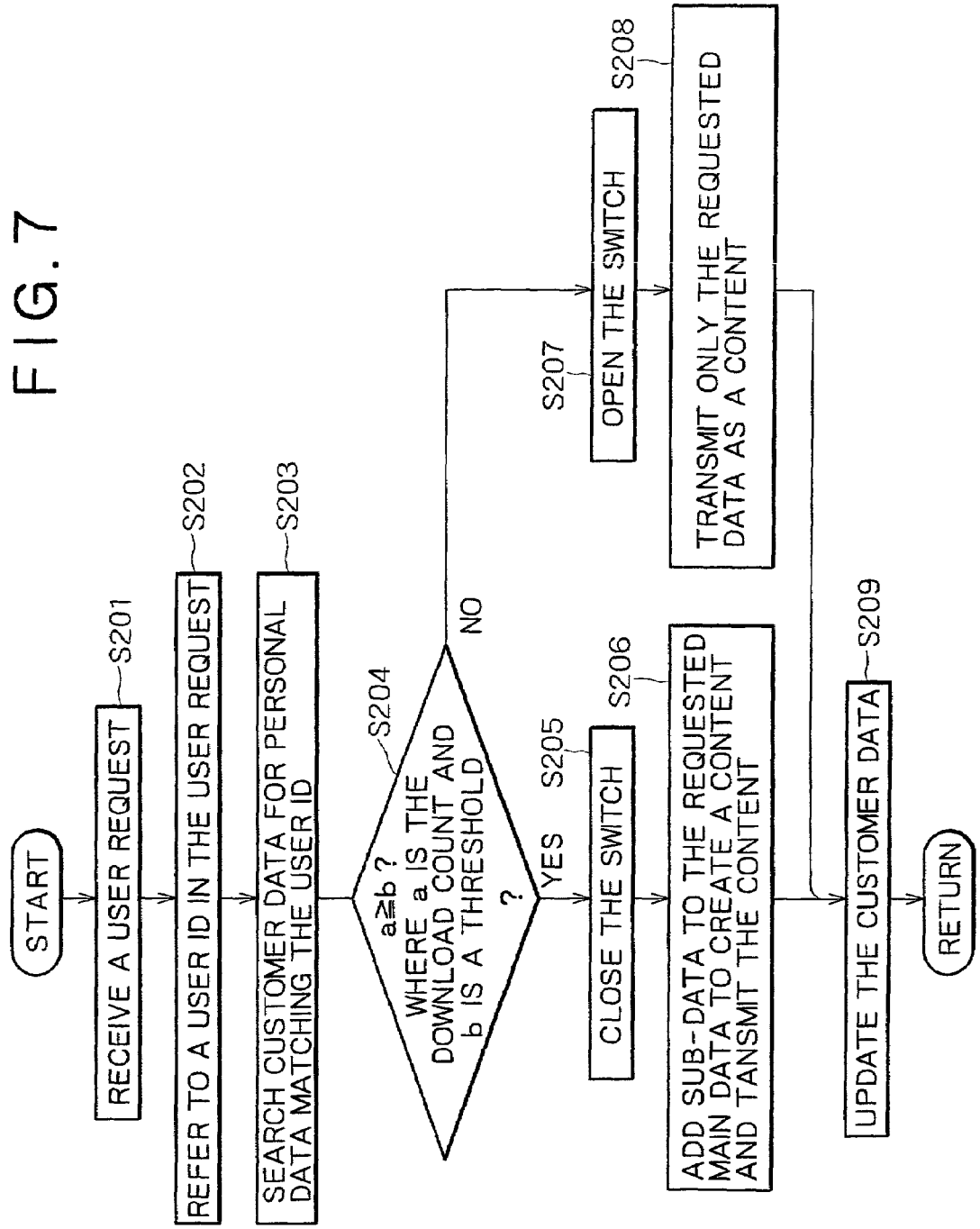
FIG. 7 is a flowchart representing the procedure of processing carried out by the second implementation of the server 1 in accordance with the present invention.

The following describes processing carried out by the server 1 with the configuration shown in FIG. 6 as a second implementation to distribute contents with reference to a flowchart shown in FIG. 7. It should be noted that, in order to make the description easy to understand, the flowchart shown in FIG. 7 only represents determination of a user level and transmission of a content according to the determined user level. Thus, other processing such as the authentication of a user is omitted.

Since pieces of processing carried out at steps S201 to S203 are the same as their counterparts carried out at the steps S101 to S103 of the flowchart shown in FIG. 4, their description is not repeated.

The flow of the operation then goes on to a step S204 to form a judgment as to whether or not the relation $a \geq b$ holds true where notation a denotes a download count and notation b denotes a download threshold. That is to say, the download count a is examined to determine whether the download count a has reached or exceeded the download threshold b. The download count is personal data obtained as a result of a search of the customer data 13A in the customer-data server 13.

A YES outcome of the judgment indicates that the user is a user with high status of system utilization. In this case, the flow of the operation goes on to a step S205 at which control is executed to put a switch 205 in a closed state.

At the next step S206, sub-data associated with the requested piece of musical data is added to the requested musical data to create a content which is then transmitted. The circuit shown in FIG. 6 carries out the following operations in order to execute processing at the step S106.

The discriminator 17 requests the main-data server 11 to search the musical database 11A for a piece of musical data specified by a content identification included in a user request, and then supply the piece of musical data found in the search to the mixer 14.

Then, the sub-data server 12 searches a database for sub-data associated with the piece of musical data specified by the content identification, and then supplies the sub-data to the mixer 14 by way of the switch 15 which has been put in a closed state.

In this second implementation, there are provided three ranks of differentiation according to user status of service utilization instead of three ranks like the user level. Thus, in this case, there is typically only a kind of sub-data to be added to main data. In the case of musical data used as main data, for example, there is only one kind of sub-data, namely, jacket data. As an alternative, a combination of jacket data and a libretto is used as the only kind of sub-data. In the processing carried out at the step S206, there is only one choice of sub-data to be added to main data.

The mixer 14 mixes the main data with the sub-data supplied to the mixer 14 in this way in accordance with a predetermined format to create a content. The mixer 14 then supplies the content to the transceiver unit 19 which subsequently transmits the content to the user terminal 5 making the request for the content by way of the Internet 4.

The above processing is carried out at the step S206.

If the outcome of the judgment formed at the step S204 is a negation, on the other hand, the flow of the operation goes on to a step S207 at which processing is carried out for a user with low status of system utilization.

In this case, control is executed at the step S207 to open the switch 15. Subsequently, at the next step S208, the discriminator 17 requests the main-data server 11 to search the musical database 11A for a piece of musical data specified by a content identification included in a user request, and then supply the piece of musical data found in the search to the transceiver unit 19 by way of the mixer 14 to be eventually transmitted. Thus, data transferred to the transceiver unit 19 by way of the mixer 14 with the switch 15 opened is only musical data serving as main data. That is to say, only musical data is transmitted as a content.

After the processing carried out at the step S206 or S208 is completed, the flow of the operation goes on to a step S209 at which the customer data 13A is updated.

Since the processing carried out at the step S209 is all but the same as that carried out at the step S111 of the flowchart shown in FIG. 4, its description is not repeated.

In the case of the second implementation, however, only the download count is used in the determination of the user status of system utilization. It is thus possible to eliminate other information such as the connection time, the connection count and the download time from the customer data 13A.

As described above, only the download count is used in the determination of the user status of system utilization. It should be noted, however, that other information such as the connection time, the connection count or the download time can also be used in the determination of the user status of system utilization.

2: COD System (Second Embodiment)

2-1: Format of High-Quality Audio Data

Next, a second embodiment of the present invention is described.

In the case of the first embodiment described above, jacket data and/or a libretto, which serve as sub-data, are added to musical data serving as main data to increase the value of a created content. In the case of the second embodiment, on the other hand, sub-data added to musical data serving as main data, that is, audio data, improves the audio quality of the audio data obtained as a result of an operation to play back the musical data.

The description begins with an explanation of a data format that allows the audio quality of audio data serving as main data to be increased by adding sub-data to the main data with reference to FIGS. 9A to 9C.

In accordance with a basic of an audio data format adopted by this embodiment, an analog audio signal with a waveform shown in FIG. 9A is converted into digital audio data at a sampling frequency fs of 88.2 kHz and to generate 16 quantization bits. In accordance with the contemporary CD format, on the other hand, the sampling frequency fs is 88.2 kHz to produce 16 quantization bits. As is obvious, the sampling frequency fs according to the audio data format adopted by this embodiment is twice the sampling frequency fs according to the CD format which has a sampling frequency fs of 44.1 kHz and 16 quantization bits.

As shown in FIG. 9A, at a sampling frequency fs of 88.2 kHz, consecutive sampling positions along the time axis are N→N+1→N+2→N+3→N+4→N+5 and so on. In order to make the description easy to understand, in the following description, notation N denotes an even number.

As shown in FIG. 9B, only sampling positions each indicated by an even number are extracted from the consecutive sampling positions denoted by N→N+1→N+2→N+3→N+4→N+5 and so on to give a sequence of times indicated by N→N+2→N+4 and so on. At this sequence of times, there exists a series of samples obtained as a result of a sampling operation at a sampling frequency fs of 44.1 kHz (=88.2 kHz/2) to produce 16 quantization bits. This series of samples is digital audio data having a quality equivalent to data with a CD format.

At the remaining positions N+1→N+3→N+5 and so on, there also exists a series of samples obtained as a result of a sampling operation at a sampling frequency fs of 44.1 kHz to produce 16 quantization bits. This series of samples is also digital audio data having a quality equivalent to data with a CD format.

Then, in this embodiment, the digital audio data shown in FIG. 9B serves as main data and the digital audio data shown in FIG. 9C serves as sub-data. It should be noted that the digital audio data shown in FIG. 9C can also naturally be used as main data and the digital audio data shown in FIG. 9B is naturally used as sub-data.

In this embodiment, with the digital audio data shown in FIG. 9B serving as main data and the digital audio data shown in FIG. 9C serving as sub-data or vice versa, only main data is transmitted to a user with low status of service utilization as a content whereas main data and sub-data added thereto are transmitted to a user with high status of service utilization as a content.

Thus, a user receiving a content comprising main data and sub-data is capable of playing back digital audio data comprising the main data and the sub-data in signal processing to be described later so as to reproduce digital audio data with a format of a 88.2-kHz sampling frequency fs and 16 quantization bits, which are explained earlier by referring to FIG. 9A. That is to say, the user is capable of playing back a piece of music with an audio quality higher than that of an operation to play back digital audio data with a format of a 44.1-kHz sampling frequency fs and 16 quantization bits.

2-2: System Configuration

Figure 8:
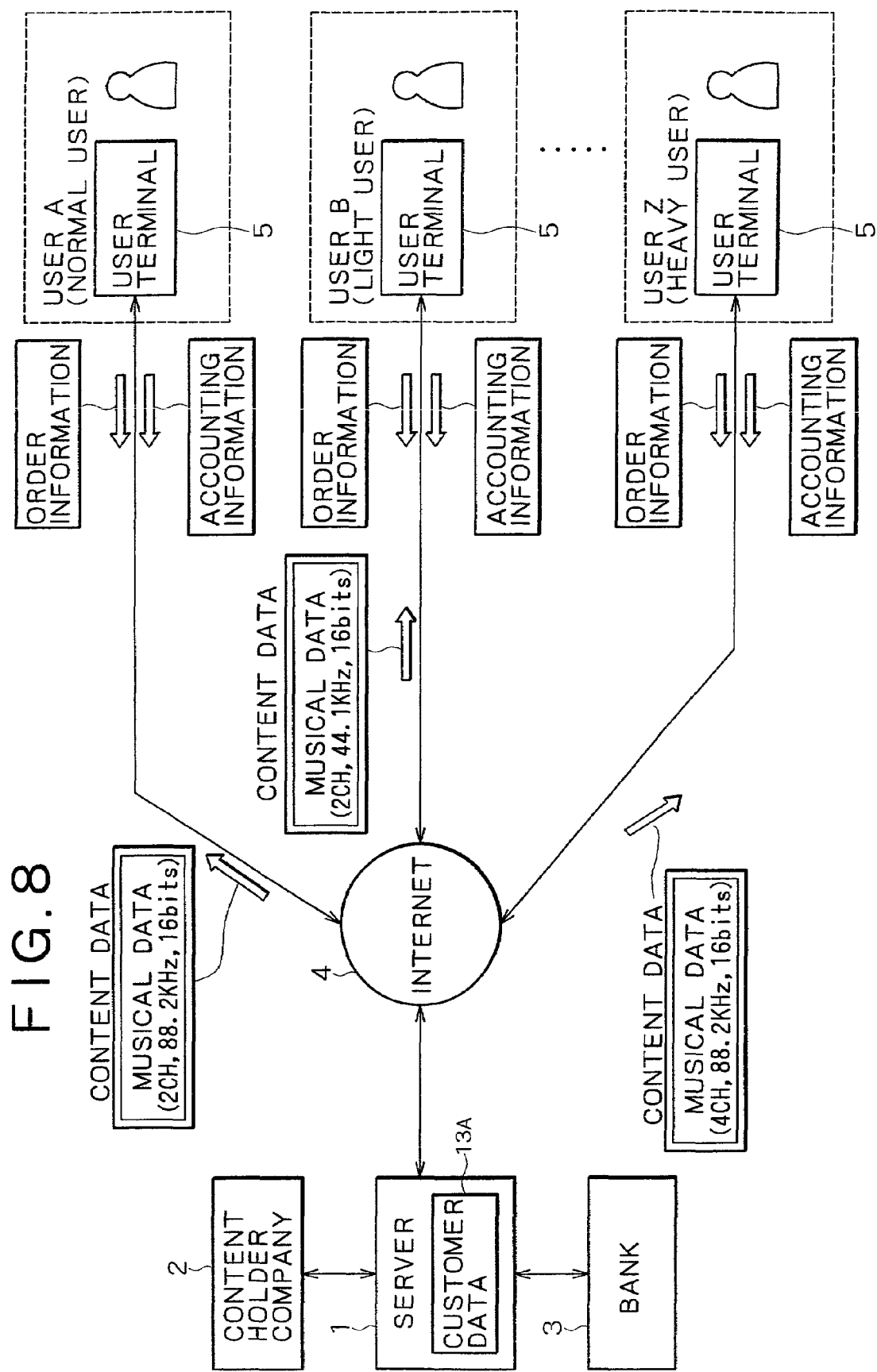
FIG. 8 is a diagram showing the overall configuration of a content-distributing system implemented by a second embodiment of the present invention.

On the assumption that the audio data has the format described above, the following describes the configuration of a COD system implemented by the second embodiment in a simple and plain manner with reference to FIG. 8. This figure is a block diagram showing the configuration of the COD system implemented by the second embodiment. Blocks identical with those employed in the COD system shown in FIG. 2 are denoted by the same reference numerals as the latter, and their description is not repeated. The following description description mainly differences in content between user levels.

Also in this case, user B is a light-spending user or a user at level 3. User B serving as a light-spending user receives 2-channel stereo audio data with a sampling frequency fs of 44.1 kHz and 16 quantization bits as a content. That is to say, user B receives digital audio data as a content comprising only main data representing a piece of music requested by the user.

If user A serving as a normal-spending user or a user at level 2 makes a request for a piece of music, in response to this request, the server 1 transmits 2-channel stereo audio data with a sampling frequency fs of 88.2 kHz and 16 quantization bits as a content. That is to say, user A receives digital audio data as a content comprising the digital audio data shown in FIG. 9B and the digital audio data shown in FIG. 9C, which are mixed to represent the piece of music requested by the user.

If user Z serving as a heavy-spending user or a user at level 3 makes a request for a piece of music, in response to this request, the server 1 transmits 4-channel audio data with a sampling frequency fs of 88.2 kHz and 16 quantization bits as a content. That is to say, user Z receives digital audio data as a content comprising not only digital audio data serving as the main data shown in FIG. 9B and digital audio data added to the main data as the sub-data shown in FIG. 9C, but also 2-channel audio data with a sampling frequency fs of 88.2 kHz and 16 quantization bits as additional sub-data. The 4-channel audio data provides typically an abundant feeling of presence on the scene, making it possible to obtain an audio quality better than that of 2-channel stereo audio data with a sampling frequency fs of 88.2 kHz and 16 quantization bits.

The configuration and the operation of the server 1 for such a COD system are the same as those of, for example, the first implementation shown in FIGS. 3 and 4 respectively. As sub-data, however, digital audio data stored in the high audio quality information database 12C of the sub-data server 12 is used.

That is to say, in the musical database 11A of the main-data server 11, pieces of music represented by the audio digital data shown in FIG. 9B are stored. In the high audio quality information database 12C of the sub-data server 12, on the other hand, pieces of music represented by the audio digital data shown in FIG. 9C are stored. In addition, 2-channel audio data with a sampling frequency fs of 88.2 kHz and 16 quantization bits is also stored for use in generation of 4-channel audio data with a sampling frequency fs of 88.2 kHz and 16 quantization bits for heavy-spending users.

It should be noted that, by applying the configuration and the operation of the second implementation shown in FIGS. 6 and 7 respectively to the second embodiment, a simplified COD system can also be obtained as well.

3: User-Terminal Configuration

The following describes a typical configuration of the user terminal 5 owned by a user in a COD system implemented by the embodiments with reference to FIG. 10. The user terminal 5 shown in FIG. 10 is implemented by a personal computer having a function to connect the personal computer to the Internet 4.

In the configuration shown in the figure, a CPU 101 carries out various kinds of processing by executing a variety of programs stored in a ROM 102.

A RAM 103 is used for storing data, programs and other information which are required by the CPU 101 in the execution of the various kinds of processing.

An I/O interface unit 104 is connected to a keyboard 105 and a mouse 106. Signals generated by the keyboard 105 and the mouse 106 are supplied to the CPU 101. The I/O interface unit 104 is also connected to a hard-disc drive (HDD) 108 including a hard disc used as a recording medium. The CPU 101 is capable of storing and retrieving data, a program and other information into and from the hard disc included in the HDD 108 through the I/O interface unit 104.

The I/O interface unit 104 is also connected to a display monitor 107 for displaying a picture.

A media driver 109 is a driver for media of a specific type. The media driver 109 reads out and writes data from and into the media.

Main data and sub-data which serve as a content in the embodiment can be recorded into discs 20 and 20A each having a format to be described later. The media driver 109 provided by the embodiment has a configuration also capable of recording and playing back data onto and from the discs 20 and 20A.

A communication interface unit 110 is an interface for carrying out communications between the user terminal 5 and the Internet 4. If the user terminal 5 is connected to the Internet 5 by a communication line, for example, the communication interface unit 110 is provided with a modem or the like. If the user terminal 5 is connected to the Internet 5 by a network, on the other hand, the communication interface unit 110 is an Ethernet interface.

A data interface unit 111 is an interface for carrying out communications between the user terminal 5 and an external peripheral apparatus conforming to a representative interface standard such as an SCSI (Small Computer Serial Interface), a USB (Universal Standard Bus) and an IEEE (Institute of Electrical and Electronic Engineers) 1394.

It should be noted that a disc driver capable of recording and playing back data onto and from the discs 20 and 20A can also be connected to the user terminal 5 as an external peripheral apparatus through the data interface unit 111.

An internal bus 112 is typically a PCI (Peripheral Component Interconnect) bus or a local bus for connecting the internal functional units to each other.

4: Operations to Record and Play Back Contents

If a disc-shaped recording medium with formats described below is used as a recording medium for recording contents according to the embodiment, it is possible to carry out recording and playback operations wherein each of the contents which is split into main data and sub-data can be more effectively used. It should be noted, however, that the format of the recording medium is not specially limited to the ones described below.

Figure 11A:
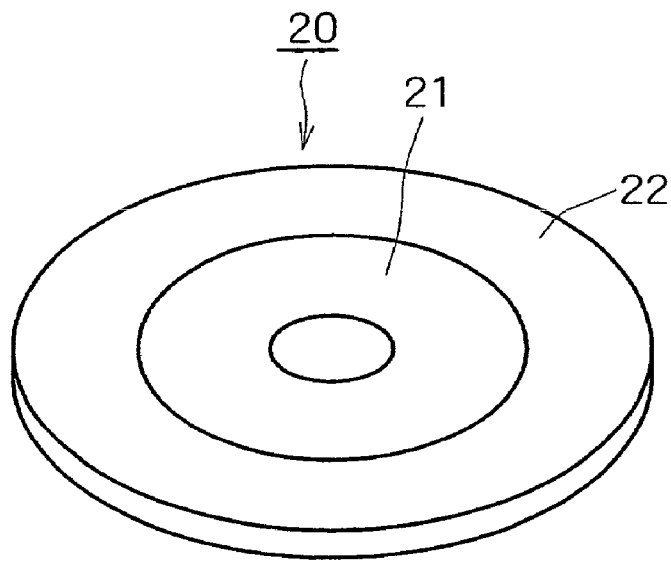
FIG. 11A is a model diagram showing a first implementation of a disc applied to the present invention.

FIG. 11A is a diagram showing a disc 20 compatible with contents provided by the embodiments. The disc 20 is a disc which data can be recorded onto and played back from. It should be noted that the recording technique of the disc is not particularly prescribed. In the present state of the art, however, it is possible to adopt a rewriting-type recording method such as a magneto-optical technique and a phase change technique. It is also possible to adopt an addition-type recording technique such as a recording method using an organic plastidial film. The recording method using an organic plastidial film is adopted for typically a CD-R.

The disc 20 is divided into a plurality of recording areas laid out in the radial direction of the disc 20. The typical disc 20 shown in the figure is split into a first recording area 21 on the inner side and a second recording area 22 on the outer side.

Main data and sub-data composing a content in accordance with the embodiments are recorded in respectively the first recording area 21 and the second recording area 22 of the disc 20.

It should be noted that, however, that the sub-data and the main data can also be reversely recorded in respectively the first recording area 21 and the second recording area 22 of the disc 20. In addition, each piece of sub-data recorded in the second recording area 22 is associated with a piece of main data recorded in the first recording area 21 by a predetermined prescription in management information recorded in a predetermined recording area on the disc 20. Details of the association and the management information are not described though.

As described above, on one disc, a plurality of recording area are provided for recording data of different types. Main data is recorded in a recording area different from that for recording sub-data.

Figure 11B:
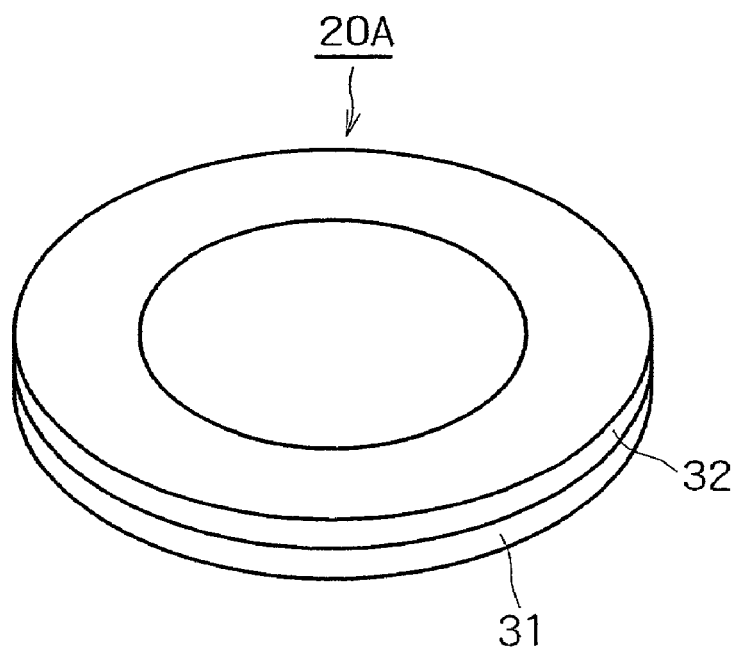
FIG. 11B is a model diagram showing a second implementation of the disc applied to the present invention.

FIG. 11B is a diagram showing a another conceivable disc 20A which is implemented differently. The disc 20A is also used for recording main data and sub-data which constitute a content in accordance with the embodiments.

Instead of being split into a plurality of recording areas provided on the same recording surface, the disc 20A shown in FIG. 11B has stacked layers, namely, a first recording layer 31 and a second recording layer 32 which each serve as a signal surface. Typically, the first and second recording layers 31 and 32 are used for recording main data and sub-data respectively. It should be noted that, also in this case, the first and second recording layers 31 and 32 can also be used reversely for recording sub-data and main data respectively.

Given the discs explained earlier by referring to FIGS. 11A and 11B, the user terminal 5 carries out operations to record and play back a content as follows.

It should be noted that, in order to make the explanation easy to understand, the disc 20 shown in FIG. 11A is assumed in the following description.

In addition, the following describes a case in which 2-channel audio data with a sampling frequency fs of 88.2 kHz and 16 quantization bits is transmitted as a content in accordance with the second embodiment. That is to say, the main data of the content is 2-channel audio data with a sampling frequency fs of 44.1 kHz and 16 quantization bits and the sub-data of the content is also 2-channel audio data with a sampling frequency fs of 44.1 kHz and 16 quantization bits.

In the user terminal 5, a content transmitted from the server 1 to the user terminal 5 is received by the communication interface unit 110 under control executed by the CPU 101.

The content comprises two kinds of data, namely, 2-channel main data with a sampling frequency fs of 44.1 kHz and 16 quantization bits and 2-channel sub-data also having a sampling frequency fs of 44.1 kHz and 16 quantization bits. While temporarily storing the content received by the communication interface unit 110 in typically the RAM 103, the CPU 101 controls the media driver 109 to record the content stored in the RAM 103 onto the disc 20 mounted on the media driver 109.

To put in detail, the 2-channel main data with a sampling frequency fs of 44.1 kHz and 16 quantization bits is recorded into the first recording area 21, and the 2-channel sub-data also having a sampling frequency fs of 44.1 kHz and 16 quantization bits is recorded into the second recording area 22. It should be noted that, in this case, the main data and the sub-data are recorded onto the disc 20 in a way depending on a format in which the data is transmitted. For example, the sub-data may be recorded after the main data has been recorded. As an alternative, the main data and the sub-data may also be recorded in predetermined data units alternately in an intermittent manner.

An operation to play back a content recorded as described above is carried out typically as shown in FIGS. 12A to 12C.

Figures 12A, 12B, 12C:
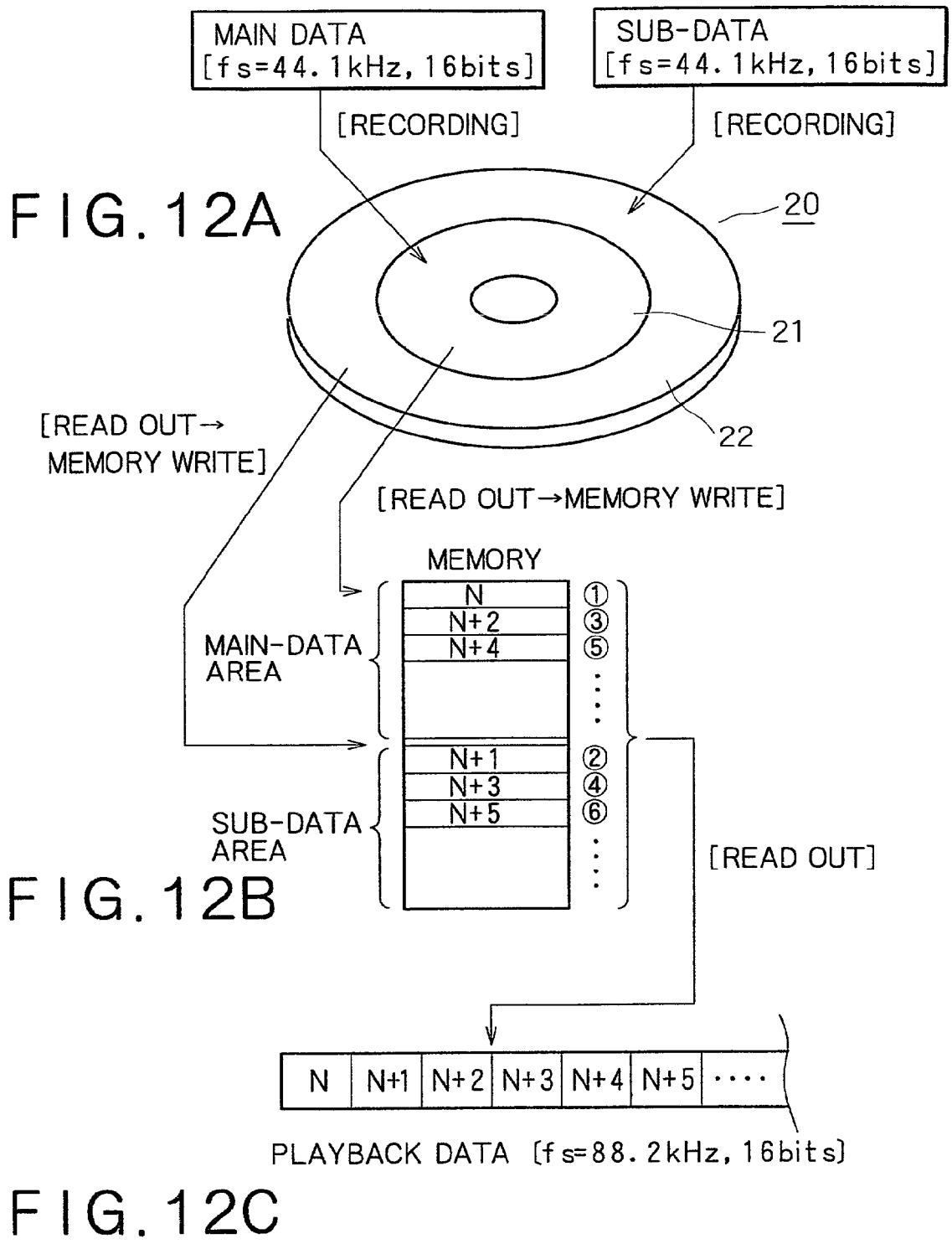
FIG. 12A is a diagram showing the first implementation of a disc applied to the present invention.
FIG. 12B is a diagram showing a model of a memory for storing data played back from the disc shown in FIG. 12A.
FIG. 12C is a diagram showing a data stream read out from the memory shown in FIG. 12B.

In the recording operation described above, the 2-channel main data with a sampling frequency fs of 44.1 kHz and 16 quantization bits is recorded into the first recording area 21, and the 2-channel sub-data also having a sampling frequency fs of 44.1 kHz and 16 quantization bits is recorded into the second recording area 22 as shown in FIG. 12A.

Then, with predetermined timings, the main data and the sub-data are read out from the first recording area 21 and the second recording area 22 respectively and stored typically in a memory which is conceptually shown in FIG. 12B.

That is to say, since the main data is an array of samples located at the positions N→N+2→N+4 and so on along the time axis as shown in FIG. 9B, the samples of the main data are sequentially stored at consecutive addresses in a main-data area of the memory which correspond to the respective positions. By the same token, since the sub-data is an array of samples located at the positions N+1→N+3→N+5 and so on along the time axis as shown in FIG. 9C, the samples of the sub-data are sequentially stored at consecutive addresses in another main-data area of the memory which correspond to the respective positions.

The samples (or the data units) stored in the memory as shown in FIG. 12B are sequentially read out from the consecutive addresses in an order according to encircled numbers shown in FIG. 12B. The order indicates that the data units, which are each a sampling unit, are read out alternately between the main data and the sub-data. The operation to read out the data units in this way results in an array of samples located at the sampling positions N→N+1→N+2→N+3→N+4→N+5 and so on as shown in FIG. 12C. This array of samples is high-audio-quality 2-channel digital audio data having a sampling frequency fs of 88.2 kHz and 16 quantization bits as the format shown in FIG. 9A.

Then, the array of samples obtained as a result of the read operation as shown in FIG. 12C is played back at a data rate corresponding to the sampling frequency fs of 88.2 kHz and then subjected to D/A conversion corresponding to the 16 quantization bits to produce a playback sound with an audio quality higher than, for example, that of the CD format.

Assume that the playback operation is carried out by the user terminal 5 shown in FIG. 10. In this case, the CPU 101 executes control to read out main data and sub data as described above from the disc 20 mounted on the media driver 109, and then to stores the data units in the RAM 103 in a layout for example like the one shown in FIG. 12B.

Then, the CPU 101 controls read addresses in the RAM 103 from which data units are read out sequentially in the order explained earlier by referring to FIG. 12B to generate digital audio data with a format shown in FIG. 12C. The digital audio data is then subjected to signal processing before being supplied to the media driver 109 by way of the I/O interface unit 104. An audio signal obtained as a result of the signal processing is finally output to a speaker attached to the display monitor 107.

In the case of a portable audio playback apparatus having a flash memory or the like, audio data obtained with the format shown in FIG. 12C may be conceivably transferred through the data interface unit 111.

By the way, for caution's sake, if a disc drive which is not compatible with the disc 20 but specially designed to drive a disc with the CD format is used for playing back or recording data from or onto the disc 20, the second recording area 22 is not recognized. Since only the first recording area 21 is recognized as a signal recording surface, the same recording and/or playback operations as the disc with the CD format are carried out.

That is to say, the disc 20 according to the embodiments has a format considering compatibility with the already existing CD format. This compatibility also holds true of the disc 20A shown in FIG. 11B. To put it in detail, if a disc drive which is not compatible with the disc 20 but specially designed to drive a disc with the CD format is used for playing back or recording data from or onto the disc 20A, the second recording layer 32 is not recognized. Since only the first recording layer 31 is recognized as a signal recording surface, the same recording and/or playback operations as the disc with the CD format are carried out.

As described above, high-audio-quality 2-channel digital audio data having a sampling frequency fs of 88.2 kHz and 16 quantization bits is transmitted to a normal-spending user as a content in the second embodiment shown in FIG. 8. That is to say, the content comprises 2-channel main data having a sampling frequency fs of 44.1 kHz and 16 quantization bits and 2-channel sub-data having a sampling frequency fs of 44.1 kHz and 16 quantization bits.

It should be noted, however, that the recording and playback operations for the disc 20 described above can be applied to 4-channel audio data having a sampling frequency fs of 88.2 kHz and 16 quantization bits or a content for a heavy-spending user in the case of the second embodiment shown in FIG. 8. This is because the disc 20 comprises the first recording area 21 for recording 2-channel digital audio data having a sampling frequency fs of 88.2 kHz and 16 quantization bits to serve as main data and the second recording area 22 for recording 2-channel sub-data having a sampling frequency fs of 88.2 kHz and 16 quantization bits to serve as sub-data.

In addition, the operation to record data onto the disc 20 can be applied not only to the second embodiment shown in FIG. 8, but also the first embodiment shown in FIG. 2.

That is to say, in the case of the disc 20, the first recording area 21 is used for recording musical data serving as main data and the second recording area 22 is used for recording sub-data such as jacket data or a libretto.

Furthermore, the recording and playback operations of the disc 20 can be applied to the disc 20A shown in FIG. 11B. To be more specific, the recording and playback operations of the first recording area 21 and the second recording area 22 on the disc 20 can be applied to the first recording layer 31 and the second recording layer 32 on the disc 20A respectively.

In the case of the first embodiment, sub-data is typically jacket data or a libretto. Moreover, other various kinds of conceivable information can also be added to a piece of music serving as main data to increase the value of the content. Examples of the other information usable as sub-data are the URL (Uniform Resource Location) of an artist relevant to the piece of music and a liner note.

In addition, a content can also comprise main data and sub-data which is a combination of sub-data according to the first embodiment and sub-data according to the second embodiment. For example, a content may include 2-channel digital audio data having a sampling frequency fs of 44.1 kHz and 16 quantization bits to serve as main data and sub-data comprising 2-channel digital audio data having a sampling frequency fs of 44.1 kHz and 16 quantization bits to improve the audio quality as well as jacket data and/or a libretto.

As described above, sub-data is added to main data of a content to improve the audio quality of the content. In addition, as another conceivable way to change the audio quality, digital audio data is compressed in accordance with a predetermined technique at different compressibility factors.

As described above, sub-data associated with main data to be downloaded is transmitted to the user terminal 5 as the status of service utilization exceeds a predetermined value. As an alternative, sub-data associated with main data already downloaded in the past is transmitted to the user terminal 5 as the status of service utilization exceeds a predetermined value.

In addition, main data in the present invention is not limited to musical data only. Main data can also be moving-picture data such as video software or some static-picture data. Conceivable sub-data associated with such main data can be picture sub-data for enhancing the resolution of the picture by interpolation the picture data serving as the main data.

As another alternative, it is also possible to transmit picture data with a compressibility factor varying in accordance with the status of service utilization or transmit data of the so-called wide-screen picture with an aspect ratio varying in accordance with the status of service utilization. That is to say, a picture with a high audio quality or a quality picture is transmitted to a user with a high status of service utilization.

In the case of a movie distributed as a content, the way the story is presented to the user can be varied in accordance with the status of service utilization. As a further alternative, a scene cut out by the producer or the director can be added to a movie distributed to heavy-spending users as a bonus.

In addition, main data can conceivably be program data of a game. Sub-data associated with such main data can conceivably be sub-data such as typically a program adding the number of story branches in the game or data allowing the number of characters or the like appearing in the game to be increased. That is to say, sub-data is added to make the game more diversified and more interesting.

Furthermore, the COD systems according to the present invention are not limited to the configurations of the first and second embodiments described above. That is to say, changes and modifications can be made properly to the embodiments.

In the case of the embodiments, for example, the user owns a personal computer serving as the user terminal 5, and operates the personal computer. It should be noted, however, that a public terminal installed at a store or the like and connected to the server 1 by a dedicated communication line can be used as a substitute for the personal computer.

As described above, in accordance with the present invention, when a user makes a request for a content, a server or an information center transmits either main data only as the requested content or main data along with sub-data as the requested content in accordance with information peculiar to the user and a user identification also included in the request.

The sub-data transmitted along with the main data is used to change the value of the content in accordance with the user's status of service utilization or the like indicated in the user-peculiar information.

In such a system implementation, different services can be rendered in dependence on the user status of service utilization. To be more specific, it is possible to apply a practice widely adopted in an ordinary market to render a good service to a user with a high status of service utilization to Internet shopping or the like. As a result, the market can be made brisker.

In addition, a user terminal according to the present invention can be used to download a content (main data) and additional data associated with the main data from the information center and store the main data and the additional data in their respective different data recording areas on a recording medium.

With the conventional playback apparatus for example, only the main data can be played back from its recording area on the recording medium. If a playback system conforming to the format of the recording medium is used, however, either only the main data can be played back from its recording area on such a recording medium or both the main data and the sub-data can be played back from their recording areas on the recording medium. That is to say, the recording medium according to the present invention is upward compatible with the conventional playback apparatus and can be used for recording a content according to the present invention as well as allows the content to be played back therefrom. The playback system conforming to the format of the recording medium is capable of efficiently recording and playing back a content distributed in accordance with the present invention. The present invention also provides broad generality that allows the user to use the existing playback apparatus or the like.

While a preferred embodiment of the invention has been described using specific terms, such description is for illustrative purposes only, and it is to be understood that changes and variations may be made without departing from the spirit or scope of the following claims.

What is claimed is:

1. A server comprising:
    content storing means for storing content items;
    user related information storing means for storing user related information corresponding to a plurality of users;
    receiving means for receiving user identification information identifying a user from the plurality of users and information identifying a content item selected for purchase by the user;
    subdata storing means for storing subdata items corresponding to the content items, the subdata items being used to improve a corresponding content item when the corresponding content item is reproduced by a user;
    comparison means for comparing the user identification information received by the receiving means with the user related information corresponding to the user stored in the user related information storing means;
    determination means for determining a utilization level for the user, the utilization level calculated using one or more of a cost of content items previously purchased by the user, an accumulated connection time for downloading the previously purchased content items to the user, or a download time for downloading the previously purchased content items to the user, wherein the utilization level is determined by evaluating the user related information from the comparison means;
    control means for selecting a subdata item corresponding to the selected content item based on the user's utilization level; and
    transmitting means for electronically transmitting the selected subdata item with the selected content item to the user,
    wherein the content items stored in the content storing means are audio content items and the subdata items stored in the subdata storing means include additional information for increasing audio quality of the audio content items.

2. The server according to claim 1 wherein the subdata items stored in the subdata storing means are at least one of jacket images, librettos, liner notes, or Uniform Resource Locator (URL) addresses.

3. The server according to claim 1 wherein the content items include game program data.

4. The server according to claim 1, wherein the utilization level is calculated using the cost of the previously purchased content items.

5. The server according to claim 1, wherein the utilization level is calculated using the accumulated connection time for downloading the previously purchased content items to the user.

6. The server according to claim 1, wherein the utilization level is calculated using the download time for downloading the previously purchased content items to the user.

7. The server according to claim 1, wherein the subdata items transmitted with the selected content item include at least one of jacket images, librettos, or liner notes.

8. A distribution system comprising an information center and a plurality of terminals connected to the information center by a communication line, the information center comprising:
    content storing means for storing content items;
    user related information storing means for storing user related information corresponding to a plurality of users;
    receiving means for receiving user identification information identifying a user from a plurality of users and information identifying a content item selected for purchase by the user;
    subdata storing means for storing subdata items corresponding to the content items, the subdata items being used to improve a corresponding content item when the corresponding content item is reproduced by a user;
    comparison means for comparing the user identification information received by the receiving means with the user related information corresponding to the user stored in the user related information storing means;
    determination means for determining a utilization level for the user, the utilization level calculated using one or more of a cost of content items previously purchased by the user, an accumulated connection time for downloading the previously purchased content items to the user, or a download time for downloading the previously purchased content items to the user, wherein the utilization level is determined by evaluating the user related information from the comparison means;
    control means for selecting a subdata item corresponding to the selected content item based on the user's utilization level; and
    transmitting means for electronically transmitting the selected subdata item with the selected content item to one of the plurality of terminals, wherein the content items stored in the content storing means are audio content items and the subdata items stored in the subdata storing means include additional information for increasing audio Quality of the audio content items.

9. The distribution system according to claim 8 wherein the subdata items stored in the subdata storing means are at least one of jacket images, librettos, liner notes, or Uniform Resource Locator (URL) addresses.

10. The distribution system according to claim 8 wherein the content items include game program data.

11. A distribution method comprising the steps of:
storing content items;
storing user related information corresponding to a plurality of users;
receiving user identification information identifying a user from the plurality of users and information identifying a content item selected for purchase by the user;
storing subdata items corresponding to the content items, the subdata items being used to improve a corresponding content item when the corresponding content item is reproduced by a user;
comparing the user identification information with the user related information corresponding to the user;
determining a utilization level for the user, the utilization level calculated using one or more of a cost of content items previously purchased by the user, an accumulated connection time for downloading the previously purchased content items to the user, or a download time for downloading the previously purchased content items to the user, wherein the utilization level is determined by evaluating the user related information;
selecting a subdata item corresponding to the selected content item based on the user's utilization level; and
electronically transmitting the selected subdata item with the selected content item to the user,
wherein the stored content items are audio content items and the stored subdata items include additional information for increasing audio quality of the audio content items.

12. A terminal capable of communicating with an information center through a communication line connecting the terminal to the information center and capable of recording and playing back data onto and from a recording medium which has a plurality of data recording areas, the terminal comprising:
transmission means for transmitting, to the information center, user identification information identifying a user and information identifying a content item selected for purchase by the user;
reception means for receiving the selected content item with a subdata item, the subdata item being selected from a plurality of subdata items based upon a utilization level calculated using one or more of a cost of content items previously purchased by the user, an accumulated connection time for downloading the previously purchased content items to the user, or a download time for downloading the previously purchased content items to the user, as determined by the information center, the selected subdata item being used to improve the selected content item when the selected content item is reproduced by the user; and
recording means for recording the selected content item and the selected subdata item in different data recording areas of the recording medium,
wherein the content items are audio content items and the subdata items include additional information for increasing audio quality of the audio content items.

13. A method comprising:
transmitting, to an information center, user identification information identifying a user and information identifying a content item selected for purchase by the user;
receiving, by the user, the selected content item with a subdata item, the subdata item being selected from a plurality of subdata items based upon a utilization level calculated using one or more of a cost of content items previously purchased by the user, an accumulated connection time for downloading the previously purchased content items to the user, or a download time for downloading the previously purchased content items to the user, as determined by the information center, the selected subdata item being used to improve the selected content item when the selected content item is reproduced by the user; and
recording the selected content item and the selected subdata item in different data recording areas of a recording medium,
wherein the content items are audio content items and the subdata items include additional information for increasing audio quality of the audio content items.

14. A server comprising:
a first memory storing content items;
a second memory storing subdata items corresponding to the content items, the subdata items being used to improve a corresponding content item when the corresponding content item is reproduced by a user;
a third memory storing user related information corresponding to a plurality of users;
a transceiver configured to receive user identification information identifying a user from the plurality of users and information identifying a content item selected for purchase by the user;
a comparator configured to compare the user identification information received by the transceiver with the user related information corresponding to the user stored in the third memory; and
a discriminator configured to determine a utilization level for the user, the utilization level calculated using one or more of a cost of content items previously purchased by the user, an accumulated connection time for downloading the previously purchased content items to the user, or a download time for downloading the previously purchased content items to the user, wherein the utilization level is determined by evaluating the user related information from the comparator and to select a subdata item corresponding to the selected content item based on the user's utilization level,
wherein the transmitter electronically transmits the selected subdata item with the selected content item to the user, and
wherein the content items are audio content items and the subdata items include additional information for increasing audio quality of the audio content items.

15. A distribution system comprising an information center and a plurality of terminals connected to the information center by a communication line, the information center comprising:
a first memory storing content items;
a second memory storing subdata items corresponding to the content items, the subdata items being used to improve a corresponding content item when the corresponding content item is reproduced by a user;

a third memory storing user related information corresponding to a plurality of users;
a transceiver configured to receive user identification information identifying a user from a plurality of users and information identifying a content item selected for purchase by the user;
a comparator configured to compare the user identification information received by the transceiver with the user related information corresponding to the user stored in the third memory; and
a discriminator configured to determine a utilization level for the user, the utilization level calculated using one or more of a cost of content items previously purchased by the user, an accumulated connection time for downloading the previously purchased content items to the user, or a download time for downloading the previously purchased content items to the user, wherein the utilization level is determined by evaluating the user related information from the comparator, the discriminator being configured to select a subdata item corresponding to the selected content item based on the user's utilization level,
wherein the transceiver electronically transmits the selected subdata item with the selected content item to one of the plurality of terminals, and
wherein the content items are audio content items and the subdata items include additional information for increasing audio quality of the audio content items.

16. A terminal capable of communicating with an information center through a communication line connecting the terminal to the information center and capable of recording and playing back data onto and from a recording medium which has a plurality of data recording areas, the terminal comprising:
a communication interface configured to transmit, to the information center, user identification information identifying a user and information identifying a content item selected for purchase by the user, and to receive the selected content item with a subdata item, the subdata item being selected from a plurality of subdata items based upon a utilization level calculated using one or more of a cost of content items previously purchased by the user, an accumulated connection time for downloading the previously purchased content items to the user, or a download time for downloading the previously purchased content items to the user, as determined by the information center, the selected subdata item being used to improve the selected content item when the selected content item is reproduced by the user; and
a disc configured to be recorded with the selected content item and the selected subdata item in different data recording areas of the disc,
wherein the content items are audio content items and the subdata items include additional information for increasing audio quality of the audio content items.

17. A server comprising:
content storing means for storing content items;
user related information storing means for storing user related information corresponding to a plurality of users;
receiving means for receiving user identification information identifying a user from the plurality of users and information identifying a content item selected for purchase by the user;
subdata storing means for storing subdata items corresponding to the content items, the subdata items being used to improve a corresponding content item when the corresponding content item is reproduced by a user;
comparison means for comparing the user identification information received by the receiving means with the user related information corresponding to the user stored in the user related information storing means;
determination means for determining a utilization level for the user, the utilization level calculated using one or more of a cost of content items previously purchased by the user, an accumulated connection time for downloading the previously purchased content items to the user, or a download time for downloading the previously purchased content items to the user, wherein the utilization level is determined by evaluating the user related information from the comparison means;
control means for selecting a subdata item corresponding to the selected content item based on the user's utilization level; and
transmitting means for electronically transmitting the selected subdata item with the selected content item to the user,
wherein the content items include pictures, and the subdata items include additional information for increasing picture quality of the picture content items.

18. A distribution system comprising an information center and a plurality of terminals connected to the information center by a communication line, the information center comprising:
content storing means for storing content items;
user related information storing means for storing user related information corresponding to a plurality of users;
receiving means for receiving user identification information identifying a user from a plurality of users and information identifying a content item selected for purchase by the user;
subdata storing means for storing subdata items corresponding to the content items, the subdata items being used to improve a corresponding content item when the corresponding content item is reproduced by a user;
comparison means for comparing the user identification information received by the receiving means with the user related information corresponding to the user stored in the user related information storing means;
determination means for determining a utilization level for the user, the utilization level calculated using one or more of a cost of content items previously purchased by the user, an accumulated connection time for downloading the previously purchased content items to the user, or a download time for downloading the previously purchased content items to the user, wherein the utilization level is determined by evaluating the user related information from the comparison means;
control means for selecting a subdata item corresponding to the selected content item based on the user's utilization level; and
transmitting means for electronically transmitting the selected subdata item with the selected content item to one of the plurality of terminals,
wherein the content items include pictures, and the subdata items include additional information for increasing picture quality of the picture content items.

19. A distribution method comprising the steps of:
storing content items;
storing user related information corresponding to a plurality of users;
receiving user identification information identifying a user from the plurality of users and information identifying a content item selected for purchase by the user;

storing subdata items corresponding to the content items, the subdata items being used to improve a corresponding content item when the corresponding content item is reproduced by a user;

comparing the user identification information with the user related information corresponding to the user;

determining a utilization level for the user, the utilization level calculated using one or more of a cost of content items previously purchased by the user, an accumulated connection time for downloading the previously purchased content items to the user, or a download time for downloading the previously purchased content items to the user, wherein the utilization level is determined by evaluating the user related information;

selecting a subdata item corresponding to the selected content item based on the user's utilization level; and electronically transmitting the selected subdata item with the selected content item to the user, wherein the content items include pictures, and the subdata items include additional information for increasing picture quality of the picture content items.

20. A terminal capable of communicating with an information center through a communication line connecting the terminal to the information center and capable of recording and playing back data onto and from a recording medium which has a plurality of data recording areas, the terminal comprising:

transmission means for transmitting, to the information center, user identification information identifying a user and information identifying a content item selected for purchase by the user;

reception means for receiving the selected content item with a subdata item, the subdata item being selected from a plurality of subdata items based upon a utilization level calculated using one or more of a cost of content items previously purchased by the user, an accumulated connection time for downloading the previously purchased content items to the user, or a download time for downloading the previously purchased content items to the user, as determined by the information center, the selected subdata item being used to improve the selected content item when the selected content item is reproduced by the user; and recording means for recording the selected content item and the selected subdata item in different data recording areas of the recording medium, wherein the content items include pictures, and the subdata items include additional information for increasing picture quality of the picture content items.

21. A method comprising:

transmitting, to an information center, user identification information identifying a user and information identifying a content item selected for purchase by the user;

receiving, by the user, the selected content item with a subdata item, the subdata item being selected from a plurality of subdata items based upon a utilization level calculated using one or more of a cost of content items previously purchased by the user, an accumulated connection time for downloading the previously purchased content items to the user, or a download time for downloading the previously purchased content items to the user, as determined by the information center, the selected subdata item being used to improve the selected content item when the selected content item is reproduced by the user; and recording the selected content item and the selected subdata item in different data recording areas of a recording medium, wherein the content items include pictures, and the subdata items include additional information for increasing picture quality of the picture content items.

22. A server comprising:

a first memory storing content items;

a second memory storing subdata items corresponding to the content items, the subdata items being used to improve a corresponding content item when the corresponding content item is reproduced by a user;

a third memory storing user related information corresponding to a plurality of users;

a transceiver configured to receive user identification information identifying a user from the plurality of users and information identifying a content item selected for purchase by the user;

a comparator configured to compare the user identification information received by the transceiver with the user related information corresponding to the user stored in the third memory; and a discriminator configured to determine a utilization level for the user, the utilization level calculated using one or more of a cost of content items previously purchased by the user, an accumulated connection time for downloading the previously purchased content items to the user, or a download time for downloading the previously purchased content items to the user, wherein the utilization level is determined by evaluating the user related information from the comparator and to select a subdata item corresponding to the selected content item based on the user's utilization level, wherein the transmitter electronically transmits the selected subdata item with the selected content item to the user, and wherein the content items include pictures, and the subdata items include additional information for increasing picture quality of the picture content items.

23. A distribution system comprising an information center and a plurality of terminals connected to the information center by a communication line, the information center comprising:

a first memory storing content items;

a second memory storing subdata items corresponding to the content items, the subdata items being used to improve a corresponding content item when the corresponding content item is reproduced by a user;

a third memory storing user related information corresponding to a plurality of users;

a transceiver configured to receive user identification information identifying a user from a plurality of users and information identifying a content item selected for purchase by the user;

a comparator configured to compare the user identification information received by the transceiver with the user related information corresponding to the user stored in the third memory; and a discriminator configured to determine a utilization level for the user, the utilization level calculated using one or more of a cost of content items previously purchased by the user, an accumulated connection time for downloading the previously purchased content items to the user, or a download time for downloading the previously purchased content items to the user, wherein the utilization level is determined by evaluating the user related information from the comparator, the discriminator being configured to select a subdata item corresponding to the selected content item based on the user's utilization level, wherein the transceiver electronically transmits the selected subdata item with the selected content item to one of the plurality of terminals, and wherein the content items include pictures, and the subdata items include additional information for increasing picture quality of the picture content items.

24. A terminal capable of communicating with an information center through a communication line connecting the terminal to the information center and capable of recording and playing back data onto and from a recording medium which has a plurality of data recording areas, the terminal comprising:

a communication interface configured to transmit, to the information center, user identification information identifying a user and information identifying a content item selected for purchase by the user, and to receive the selected content item with a subdata item, the subdata item being selected from a plurality of subdata items based upon a utilization level calculated using one or more of a cost of content items previously purchased by the user, an accumulated connection time for downloading the previously purchased content items to the user, or a download time for downloading the previously purchased content items to the user, as determined by the information center, the selected subdata item being used to improve the selected content item when the selected content item is reproduced by the user; and a disc configured to be recorded with the selected content item and the selected subdata item in different data recording areas of the disc, wherein the content items include pictures, and the subdata items include additional information for increasing picture quality of the picture content items.

* * * * *